(12) United States Patent
Roessler

(10) Patent No.: US 10,477,104 B1
(45) Date of Patent: Nov. 12, 2019

(54) IMAGE SENSOR SELECTION IN A MULTIPLE IMAGE SENSOR DEVICE

(71) Applicant: Amazon Technologies, Inc., Seattle, WA (US)

(72) Inventor: Ross David Roessler, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 686 days.

(21) Appl. No.: 14/929,928

(22) Filed: Nov. 2, 2015

(51) Int. Cl.
| | |
|---|---|
| H04N 5/232 | (2006.01) |
| H04N 7/18 | (2006.01) |
| H04N 13/189 | (2018.01) |
| H04N 13/324 | (2018.01) |
| H04N 13/398 | (2018.01) |

(52) U.S. Cl.
CPC ..... *H04N 5/23238* (2013.01); *H04N 5/23293* (2013.01); *H04N 7/183* (2013.01); *H04N 13/189* (2018.05); *H04N 13/324* (2018.05); *H04N 13/398* (2018.05)

(58) Field of Classification Search
CPC ............ H04N 5/23238; H04N 13/398; H04N 13/324; H04N 13/189; H04N 5/23293; H04N 7/183
See application file for complete search history.

(56) References Cited

U.S. PATENT DOCUMENTS

| | | | |
|---|---|---|---|
| 9,036,943 B1* | 5/2015 | Baldwin | G06K 9/00664 382/103 |
| 2009/0231447 A1* | 9/2009 | Paik | G01S 3/7864 348/208.4 |
| 2016/0088287 A1* | 3/2016 | Sadi | H04N 19/54 348/43 |
| 2017/0052566 A1* | 2/2017 | Ka | G06F 3/0483 |

* cited by examiner

*Primary Examiner* — Tracy Y. Li
(74) *Attorney, Agent, or Firm* — K&L Gates LLP

(57) ABSTRACT

Various examples are directed to systems and methods for selecting image sensors in a multiple image sensor device. A control circuit may receive a first frame from the first image sensor and a second frame from the second image sensor. The control circuit may receive object data describing an object depicted in the first frame and may turn off the second image sensor.

15 Claims, 14 Drawing Sheets

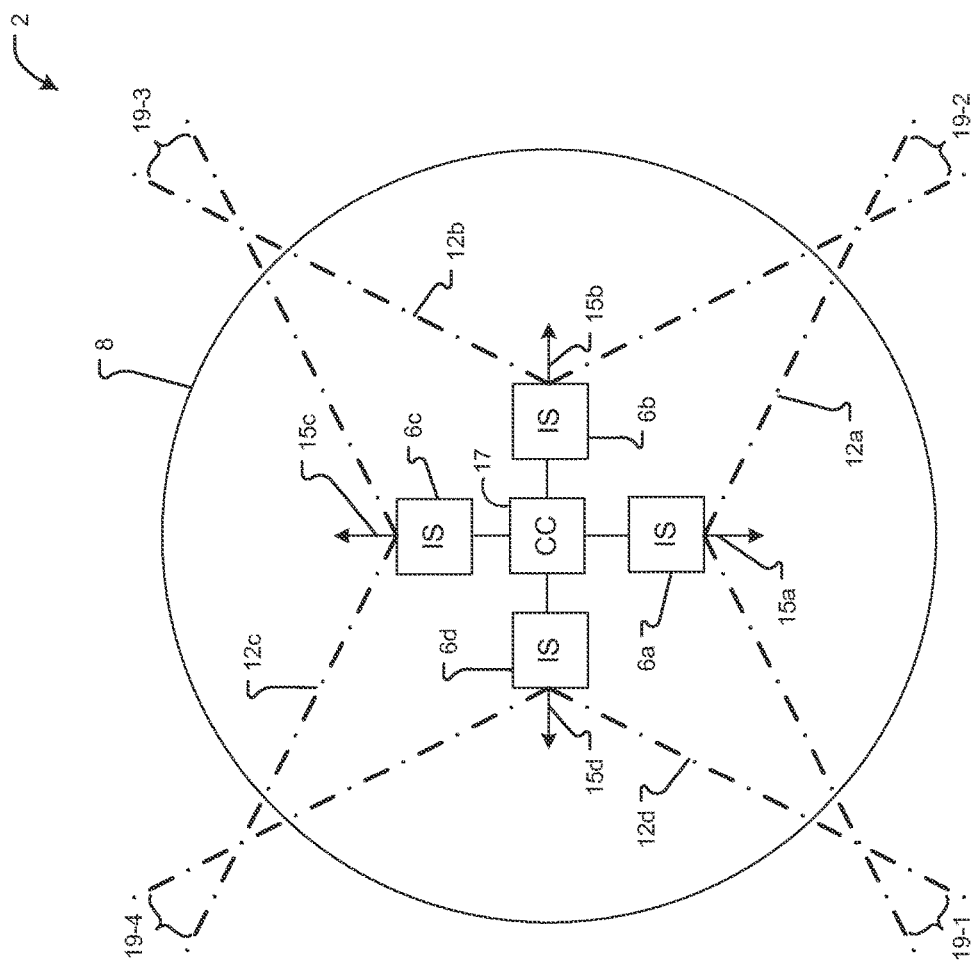
FIG. 2
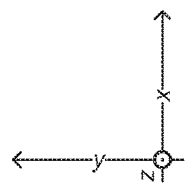

IMAGE SENSOR SELECTION IN A MULTIPLE IMAGE SENSOR DEVICE

BACKGROUND

Panoramic cameras capture large quantities of data, which can require more local data storage and power consumption at the panoramic camera compare to non-panoramic cameras. There is a need for technical solutions that can be leveraged to improve efficiency of panoramic and other types of cameras.

BRIEF DESCRIPTION OF DRAWINGS

FIG. 2 is a diagram showing a cross-sectional view of one example of the panoramic camera of FIG. 1.

DETAILED DESCRIPTION

Figure 1:
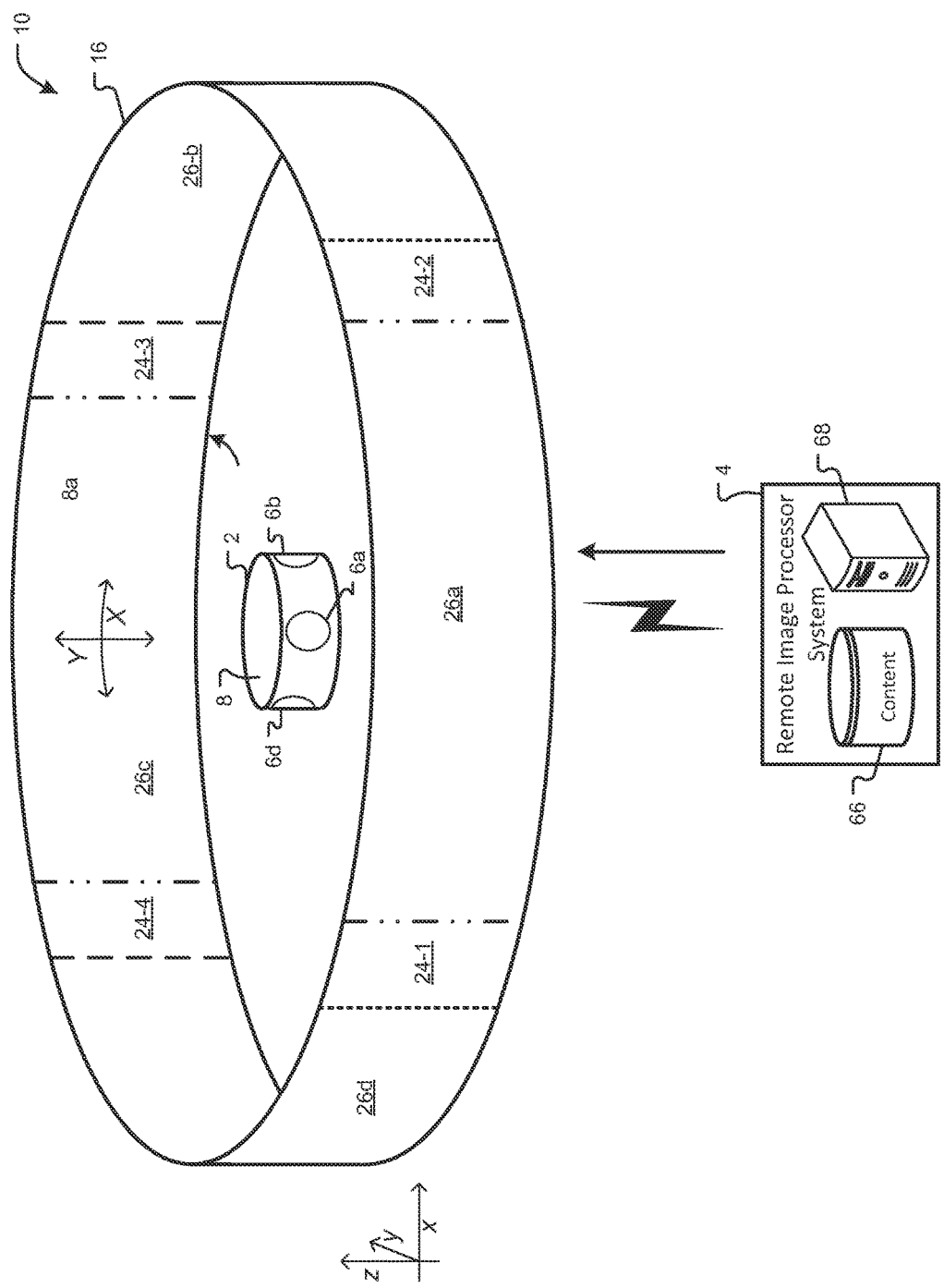
FIG. 1 is a diagram showing one example of an environment comprising a panoramic camera and a remote image processor system.

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples are directed to systems and methods for selecting image sensors for capturing image sensor frames in a panoramic camera system. For example, a panoramic camera may include multiple image sensors with partially-overlapping fields-of-view. Each image sensor may capture an image sensor frame depicting a portion of the three-dimensional scene surrounding the panoramic camera system. For example, an image sensor frame may depict a portion of the three-dimensional scene that generates or reflects light within the field-of-view of the image sensor. A control circuit of the panoramic camera may stitch or otherwise combine image sensor frames from some or all of the image sensors into a panoramic frame depicting a portion of the three-dimensional scene larger than the fields-of-view of the individual image sensors. In some examples, the panoramic frame may reflect a 360° field-of-view. Panoramic frames may be utilized as still images. In some examples, multiple panoramic frames may be captured according to a temporal sequence to form a panoramic video.

Sometimes, the entirety of the three-dimensional scene visible to a panoramic camera may include content that the user would like to depict (e.g., content of interest). In other cases, however, only a portion of the three-dimensional scene is of interest to the user. For example, if the panoramic camera is used to capture frames showing a person, the person may be depicted in just a portion of a panoramic frame, with large portions of the panoramic frame depicting portions of the scene that are not of interest to the user. Also, for example, if a user holds the panoramic camera in his or her hand, the user's hand or arm may obscure one or more of the image sensors. Panoramic cameras, however, still expend power and data storage resources to create a panoramic frame even when large parts of the panoramic frame are of no interest to the user.

In some examples, the control circuit may be programmed, either alone or in conjunction with a remote image processor system, to identify portions of the three-dimensional scene visible to the panoramic camera that do not include content of interest and selectively turn off one or more image sensors of the panoramic camera. Image sensors that are turned off may not provide image sensor frames that are stitched or otherwise combined into subsequent panoramic frames. For example, the control circuit may stitch panoramic frames from image sensor frames captured at fewer than all of the image sensors. In this way, the panoramic camera may not use resources capturing and storing image sensor frames that are not of-interest to the user. This may reduce the power usage and amount of local data storage that is required by panoramic camera. In some examples, this may reduce the heat generated by the panoramic camera and improve its operation.

Figure 3:
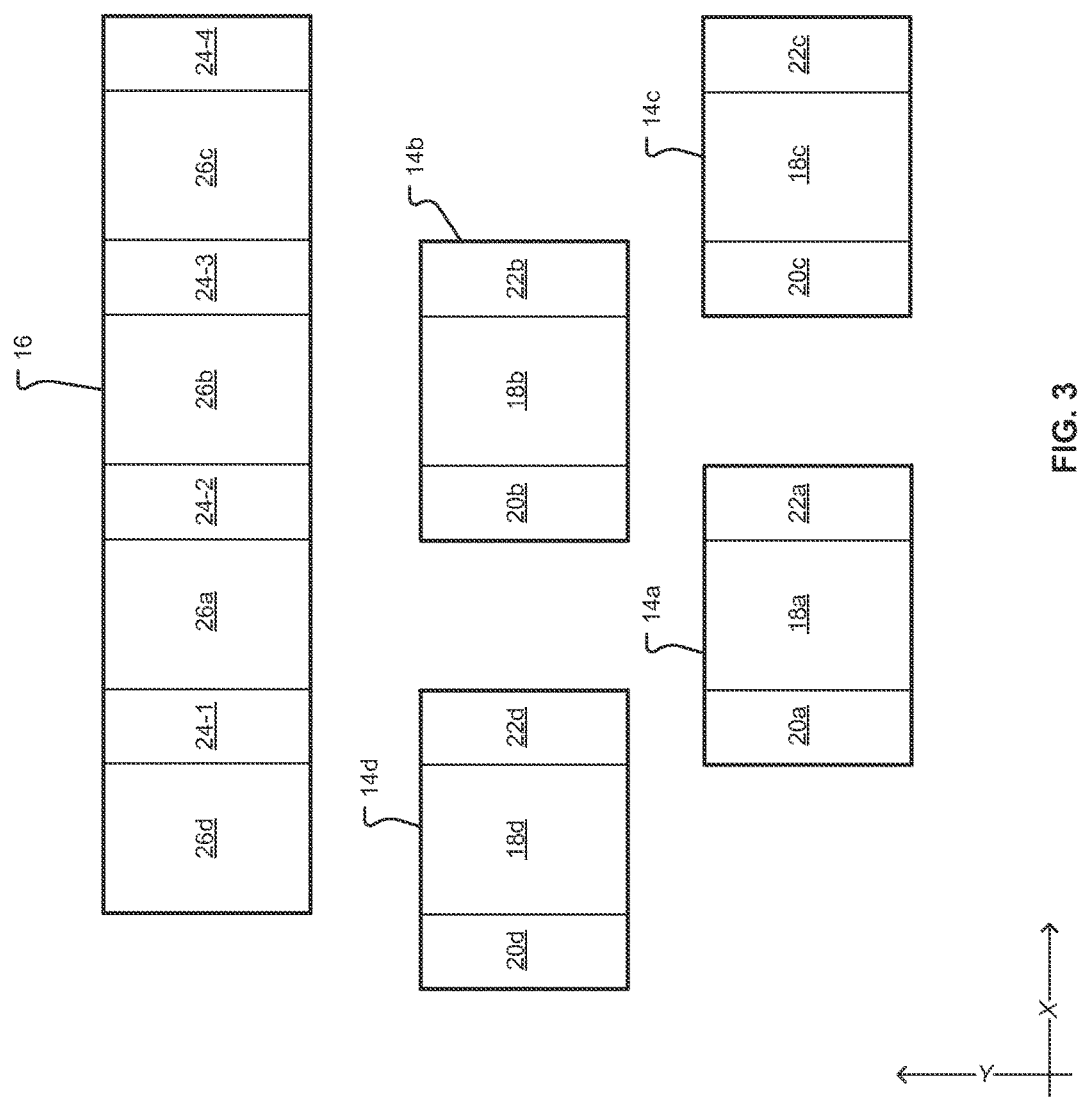
FIG. 3 is a diagram showing example image sensor frames captured by the panoramic camera of FIG. 1 and an example panoramic frame stitched from the image sensor frames.

FIG. 1 is a diagram showing one example of an environment 10 comprising a panoramic camera 2 and a remote image processor system 4. The panoramic camera 2 may capture frames depicting a scene around the panoramic camera 2. The scene may be in three dimensions around the camera 2, indicated by the x, y, and z dimensions shown in FIG. 1. FIG. 2 is a diagram showing a cross-sectional view of one example of the panoramic camera 2. FIG. 3 is a diagram showing example image sensor frames 14a, 14b, 14c, 14d and an example panoramic frame 16 stitched from the image sensor frames 14a, 14b, 14c, 14d.

The panoramic camera 2 may comprise four image sensors 6a, 6b, 6c, 6d. Referring to FIGS. 1 and 2, the image sensors 6a, 6b, 6c, 6d may be mounted in a mounting assembly 9 in any suitable manner. Adjacent image sensors 6a, 6b, 6c, 6d may be rotated by 90°. For example, image sensor directions 15a, 15b, 15c, 15d of the respective image sensors 6a, 6b, 6c, 6d may be mutually orthogonal. Image sensor directions 15a, 15b, 15c, 15d may be positioned, for example, at the center of the respective fields-of-view 12a, 12b, 12c, 12d. Although four image sensors 6a, 6b, 6c, 6d are shown, panoramic cameras according to various examples may use any suitable number of image sensors 6a, 6b, 6c, 6d. Also, it is envisioned that the image sensors 6a, 6b, 6c, 6d may be arranged in other orientations such as, for example, a side-by-side orientation similar to the one illustrated in FIG. 6.

Each image sensor may have a field-of-view 12a, 12b, 12c, 12d describing a portion of the three-dimensional scene that is visible to the image sensor 6a, 6b, 6c, 6d. For example, each image sensor 6a, 6b, 6c, 6d may comprise one or more lenses, mirrors or other suitable optical components for focusing light incident from portions of the scene within the respective fields-of-view 12a, 12b, 12c, 12d onto respective image sensor elements (not shown). Image sensor elements may be or include any suitable type of sensor including, for example, charge coupled devices. Image sensor elements may comprise a plurality of pixels arranged in a two-dimensional grid. When light is incident on the image sensor element, each pixel may generate a signal indicative of the light incident on that pixel.

The fields-of-view 12a, 12b, 12c, 12d of the image sensors 6a, 6b, 6c, 6d may partially overlap, as shown. For example, field-of-view 12a of the image sensor 6a partially overlaps the field-of-view 12d of the image sensor 6d at overlap region 19-1. Field-of-view 12a of the image sensor 6a also partially overlaps the field-of-view 12b of the image sensor 6b at overlap region 19-2. Field-of-view 12b of the image sensor 6b partially overlaps field-of-view 12c of the image sensor 6c at overlap region 19-3. Field-of-view 12c of the image sensor 6c also partially overlaps the field-of-view 12d of the image sensor 6d at overlap region 19-4. In some examples, the fields-of-view 12a, 12b, 12c, 12d may be equal (e.g., the fields-of-view 12a, 12b, 12c, 12d may subtend the same angle). For example, each of the example fields-of-view 12a, 12b, 12c, 12d shown in FIG. 2 subtend 120° in the xy plane. In the example of FIG. 2, the overlap regions 19-1, 19-2, 19-3, 19-4 subtend 15° in the xy plane. Accordingly, the image sensors 6a, 6b, 6c, 6d may subtend a 360° field-of-view in the xy plane. The fields-of-view of the image sensors 6a, 6b, 6c, 6d may subtend any suitable angle or angles along the z dimension. In some examples, the field-of-view of the panoramic camera 2 may be as much as $4\pi$ steradians.

A control circuit 17 of the panoramic camera 2 may receive image sensor frames 14a, 14b, 14c, 14d captured by the respective image sensors 6a, 6b, 6c, 6d (FIG. 3). Each image sensor frame 14a, 14b, 14c, 14d may comprise a plurality of pixel values and spatial data describing a two-dimensional spatial arrangement of the pixel values. For example, each pixel value may represent the output signal from a pixel of the respective image sensor elements. The spatial data may describe an arrangement of the pixel values corresponding to the arrangement of pixels at the image sensor element. Accordingly, when an image sensor frame is captured by an image sensor element, pixel values in the image sensor frame may have a one-to-one correlation to the pixel elements of the image sensor element. In various examples, an image sensor frame 14a, 14b, 14c, 14d may be subjected to processing after it is captured such as, for example, stitching, compression, encoding, etc. After processing, processed image sensor frames and/or frames derived from image sensor frames or processed image sensor frames may comprise pixel values and spatial data, however, each pixel value in a processed or derived frame may not be directly traceable to a specific image sensor pixel.

Referring to FIG. 3, example image sensor frames 14a, 14b, 14c, 14d are shown. Each image sensor frame 14a, 14b, 14c, 14d may comprise an exclusive region 18a, 18b, 18c, 18d and overlap regions 20a, 22a, 20b, 22b, 20c, 22c, 20d, 22d. Exclusive regions may correspond to the portion of the fields-of-view 12a, 12b, 12c, 12d of the capturing image sensor 6a, 6b, 6c, 6d that does not overlap the field-of-view of another image sensor. For example, referring to the image sensor frame 14a, the exclusive region 18a may correspond to pixel elements of the image sensor 6a that receive light incident from the portion of the field-of-view 12a that excludes overlap regions 19-1 and 19-2. Overlap regions 20a, 22a, 20b, 22b, 20c, 22c, 20d, 22d, on the other hand, may correspond to portions of the fields-of-view 12a, 12b, 12c, 12d of the capturing image sensor 6a, 6b, 6c, 6d that overlap the field-of-view of another image sensor. For example, referring again to the example image sensor frame 14a, overlap region 20a may correspond to pixel elements of the image sensor 6a that receive light incident from the overlap region 19-1 of the field-of-view 12a. Similarly, the overlap region 22a may correspond to pixel elements of the image sensor 6a that receive light incident from the overlap region 19-2 of the field-of-view 12a. Also, because the overlap regions 19-1, 19-2, 19-3, 19-4 are part of the fields-of-view of more than one image sensor, the portion of the three-dimensional scene represented at an overlap region 20a, 20b, 20c, 20d may also be represented at the overlap region 22a, 22b, 22c, 22d of another image sensor frame. For example, light incident from the overlap region 19-1 may be represented at the overlap region 20a of image sensor frame 14a and at overlap region 22d of image sensor frame 14d.

The control circuit 17 and/or remote image processor system 4 may stitch image sensor frames 14a, 14b, 14c, 14d to form a panoramic frame 16. The panoramic frame 16 may have exclusive regions 26a, 26b, 26c, 26d that correspond to the respective exclusive regions 18a, 18b, 18c, 18d of the image sensor frames 14a, 14b, 14c, 14d. For example, the pixel values from the exclusive region 18a of the image sensor frame 14a, including the spatial arrangement thereof, may be included at the exclusive region 26a. The panoramic frame 16 may also comprise hybrid regions 24-1, 24-2, 24-3, 24-4. Hybrid regions 24-1, 24-2, 24-3, 24-4 may be derived from pixel values in corresponding overlap regions 20a, 20b, 20c, 20d, 22a, 22b, 22c, 22d, including the spatial arrangements thereof. For example, the hybrid region 24-1 may be derived from a combination of the overlap region 20a of the image sensor frame 14a and the overlap region 22d of the image sensor frame 14d. Referring again to FIG. 1, the panoramic frame 16 is shown positioned around the panoramic camera 2 to illustrate its relationship to the image sensors 6a, 6b, 6c, 6d and the three-dimensional scene described by the x, y, and z dimensions.

As described herein, in some examples, the control circuit 17 may turn off one or more of the image sensors 6a, 6b, 6c, 6d. Image sensors 6a, 6b, 6c, 6d may be turned off in various different ways. In some examples, the control circuit 17 may turn off an image sensor by cutting power to the image sensor. Accordingly, the turned off image sensor may not capture further images until it is turned on (e.g., powered on). In this way, power drawn by the image sensor may be reduced or eliminated. Storage utilized at the panoramic camera 2 may also be reduced because the turned off image sensor may not capture images to be stored. Also, in some examples, the control circuit 17 may turn off an image sensor by discarding image sensor frames captured by the image sensor. The turned off image sensor may continue to capture frames, however, the control circuit 17 may discard the captured frames without storing them. In this way, the usage of data storage at the panoramic camera 2 may be reduced.

In some examples, the control circuit 17 may buffer frames received from image sensors that are turned off. Buffering frames received from an image sensor may comprise storing a predetermined number of frames captured by an image sensor. When a new frame is captured, it may be added to the buffer while the oldest frame in the buffer is deleted. Frames may be buffered for various purposes. For example, if a fast-moving object moves into the field-of-view of a turned-off image sensor 6a, 6b, 6c, 6d before the control circuit 17 can turn it back on, then the control circuit 17 may capture depictions of the object from the buffered frames. Also, in some examples, the control circuit 17 (and/or the remote image processor system 4) may analyze buffered frames from a turned-off image sensor to determine whether properties of the buffered frames (e.g., brightness, color spectrum, presence or absence of an object depiction, etc.) indicate that the turned-off image sensor should be turned on.

In some examples, when one or more of the image sensors 6a, 6b, 6c, 6d are turned off, the control circuit 17 may continue to generate a panoramic frame 16. For example, instead of forming a panoramic frame 16 from four image sensor frames 14a, 14b, 14c, 14d, the control circuit 17 and/or remote image processor system 4 may generate output frames that do not include current data from all image sensors 6a, 6b, 6c, 6d. For example, if the image sensor 6d is turned off, exclusive region 26d of the panoramic frame 16 may be omitted. Region 24-1, instead of being derived from the overlap regions 22d and 20a, may be derived from overlap region 20a only, including the spatial arrangement thereof. In some examples, non-adjacent image sensors may be turned off at the same time. For example, image sensor 6a and 6c may be turned off at the same time. In this example, instead of generating a panoramic frame, the control circuit 17 may provide as an output frame of the panoramic camera 2 the two image sensor frames 14b, 14d from the image sensors 6b, 6d that are not turned off. If only one image sensor is turned on, frames captured by that image sensor may be the output frames of the panoramic camera 2.

Also, in some examples, when an image sensor is turned off, the control circuit 17 may generate the output frame using one or more image sensor frames previously captured by the turned off image sensor. In this way, an output frame may utilize previous data from turned off image sensor or sensors but not frames (e.g., data) captured by the turned off image sensor or sensors subsequent to the camera being turned off (e.g., subsequent to the last frame captured by a turned off camera before it was turned off). In some example, utilizing previously-captured frames from turned off image sensors may simplify the stitching process, for example, by allowing the control circuit 17 to pre-compute distortion parameters and/or other stitching parameters for the re-used frame. The output of the panoramic camera 2 may be utilized in any suitable manner. For example, it may be stored at the panoramic camera 2, sent to the remote image processor system 4 for storage, distribution or analysis, displayed at the panoramic camera 2 and/or displayed at another computing device utilizing a display application, as described herein.

Figure 4:
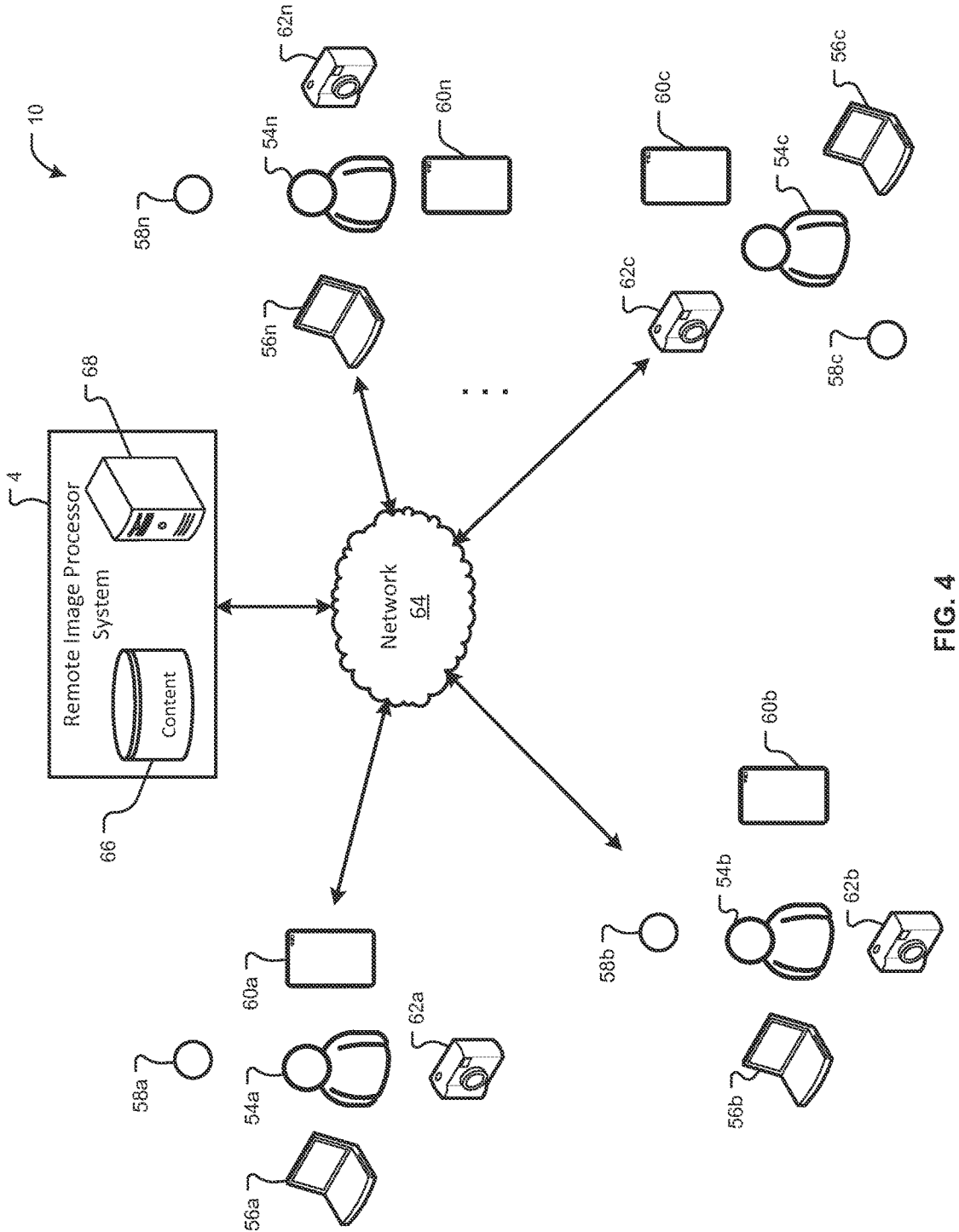
FIG. 4 is a diagram showing another example of the environment of FIG. 1 including additional components.

FIG. 4 is a diagram showing another example of the environment 10 including additional components. The environment 10 comprises the remote image processor system 4 and users 54a, 54b, 54c, 54n. Each user 54a, 54b, 54c, 54n may use one or more user devices such as, for example, panoramic cameras 58a, 58b, 58c, 58n, digital cameras 62a, 62b, 62c, 62n, mobile devices 60a, 60b, 60c, 60n, or other computing devices 56a, 56b, 56c, 56n. Although four users 54a, 54b, 54c, 54n are shown, any suitable number of users 54a, 54b, 54c, 54n may be part of the environment. Also, although each user 54a, 54b, 54c, 54n shown in FIG. 4 is associated with a panoramic camera 2a, 2b, 2c, 2n, a mobile device 60a, 60b, 60c, 60n, a digital camera 62a, 62b, 62c, 62n and a computing device 56a, 56b, 56c, 56n, some users 54a, 54b, 54c, 54n may use additional user devices and/or fewer user devices than what is shown.

User devices may be utilized to capture videos that may be stored locally and/or sent to the remote image processor system 4. As described herein, the user devices alone or in conjunction with the remote image processor system 4 may select image sensors at the user devices to be turned off when content-of-interest is not depicted by image sensor frames captured from the image sensor to be turned off. Panoramic cameras 58a, 58b, 58c, 58n may include one or more image sensors and associated optics to capture panoramic frames (e.g., images and/or videos) as described herein. Panoramic cameras 58a, 58b, 58c, 58n may have a panoramic field-of-view larger than that of a standard camera. For example, panoramic cameras 58a, 58b, 58c, 58n may have a field-of-view of about 180° or greater. Some panoramic cameras 58a, 58b, 58c, 58n may have fields-of-view as large as 360° and/or 4π steradians, as described herein. In some examples, a panoramic camera 58a, 58b, 58c, 58n may comprise a single image sensor with lenses, mirrors, or other optics allowing the single image sensor to receive electromagnetic radiation (e.g., light) from the panoramic field-of-view. In some examples, a panoramic camera 58a, 58b, 58c, 58n may comprise multiple image sensors (e.g., with overlapping fields-of-view). The panoramic camera 58a, 58b, 58c, 58n (or another component of the environment 10) may be configured to stitch frames from the respective image sensors into a single panoramic frame. In some examples, a panoramic camera 58a, 58b, 58c, 58n may be configured to communicate with other components of the environment 10 utilizing, for example, a wired or wireless connection. For example, a panoramic camera 58c, 58n may upload a frame or frames to a companion user device, such as a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a panoramic camera 58a, 58b, 58c, 58n may be configured to upload frames directly to the remote image processor system 4, for example, via the network 8.

Digital cameras 62a, 62b, 62c, 62n may comprise any suitable device with one or more image sensors to capture an image and/or video. In some examples, digital cameras 62a, 62b, 62c, 62n may be configured to communicate with other components of the environment 10 utilizing, for example, a wired or wireless connection. For example, a digital camera 62a, 62b, 62c, 62n may upload images and/or videos to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a digital camera 62a, 62b, 62c, 62n may be configured to upload images and/or video directly to a remote image processor system 4, for example, via the network 8. Also, in some examples, a digital camera 62a, 62b, 62c, 62n may comprise a processor and/or other components to implement video compression, as described herein. Digital cameras 62a, 62b, 62c, 62n may have one or more than one image sensor and may have a standard or panoramic field-of-view.

A mobile device 60a, 60b, 60c, 60n may be any suitable type of computing device comprising a processor and data storage. In some examples, a mobile device 60a, 60b, 60c, 60n may be configured to receive frames captured by a panoramic camera 58a, 58b, 58c, 58n or digital camera 62a, 62b, 62c, 62n and transfer the frames to the remote image processor system 4. In some examples, a mobile device 60a, 60b, 60c, 60n may execute a remote image processor for enhancing frames and/or videos received, for example, from a panoramic camera 58a, 58b, 58c, 58n or digital camera 62a, 62b, 62c, 62n. Also, in some examples, a mobile device 60a, 60b, 60c, 60n may comprise one or more image sensors and associated optics for capturing video and either uploading the video to the remote image processor system 4 or performing compression, described herein. In some examples, a mobile device 60a, 60b, 60c, 60n may be configured to communicate on a cellular or other telephone network in addition or instead of the network 8.

A computing device 56a, 56b, 56c, 56n may be any suitable type of computing device comprising a processor and data storage including, for example, a laptop computer, a desktop computer, etc. In some examples, a computing device 56a, 56b, 56c, 56n may be configured to receive videos captured by a panoramic camera 58a, 58b, 58c, 58n or digital camera 62a, 62b, 62c, 62n and transfer the videos for compression at the remote image processor system 4. In some examples, a computing device 56a, 56b, 56c, 56n may be configured to execute an image processor for processing videos received, for example, from a panoramic camera 58a, 58b, 58c, 58n or digital camera 62a, 62b, 62c, 62n. Also, in some examples, a computing device 56a, 56b, 56c, 56n may comprise one or more image sensors and associated optics for capturing video and either uploading the video to the remote image processor system 4 or performing compression locally.

The remote image processor system 4 may perform various processing on frames received from users 54a, 54b, 54c, 54n (e.g., user devices associated with the user). For example, the image processor system 4 may identify objects or other content-of-interest in frames received from users 54a, 54b, 54c, 54n. This may allow user devices, such as the panoramic cameras 58a, 58b, 58c, 58n, to turn off one or more image sensors, as described herein. In some examples, the remote image processor system 4 may perform other processing on frames received from the users 54a, 54b, 54c, 54n. For example, the remote image processor system 4 may perform various enhancements to frames received from the user devices.

The remote image processor system 4 may comprise one or more data stores 66 and one or more servers 68. The data store 66 may store panoramic frames and/or transmission frames received from the various user devices. The various components 68, 66 of the remote image processor system 4 may be at a common geographic location and/or may be distributed across multiple geographic locations. For example, the remote image processor system 4 may be implemented in whole or in part as a cloud or Software as a Service (SaaS) system. In some examples, the remote image processor system 4 may communicate with multiple different users 54a, 54b, 54c, 54n (e.g., via their associated cameras, computing devices, or other devices). The various components of the environment 10 may be in communication with one another via a network 8. The network 8 may be and/or comprise any suitable wired or wireless network configured according to any suitable architecture or protocol. In some examples, the network 8 may comprise the Internet.

In some examples, cameras, such as panoramic camera 58a, 58b, 58c, 58n and other camera 62a, 62b, 62c, 62n may comprise display components for displaying frames and/or videos captured by the cameras. Also, in some examples, a computing device 56a, 56b, 56c, 56n and/or mobile device 60a, 60b, 60c, 60n may execute a display application for displaying frames and/or videos received from a camera. The display application may utilize a wired or wireless connection between the mobile or other computing device to receive frames sent by the camera (e.g., a control circuit of the camera). The wired or wireless medium may include the network 64 and/or a direct connection (e.g., Bluetooth™, Bluetooth LE™, NFC, etc.) When the display application receives a frame or frames from a camera, it may display the frame or frames on a display component at its mobile or other computing device. Display applications may be used as a supplement to display components on cameras themselves and/or may be used in examples where a camera lacks an onboard display component.

Figure 5:
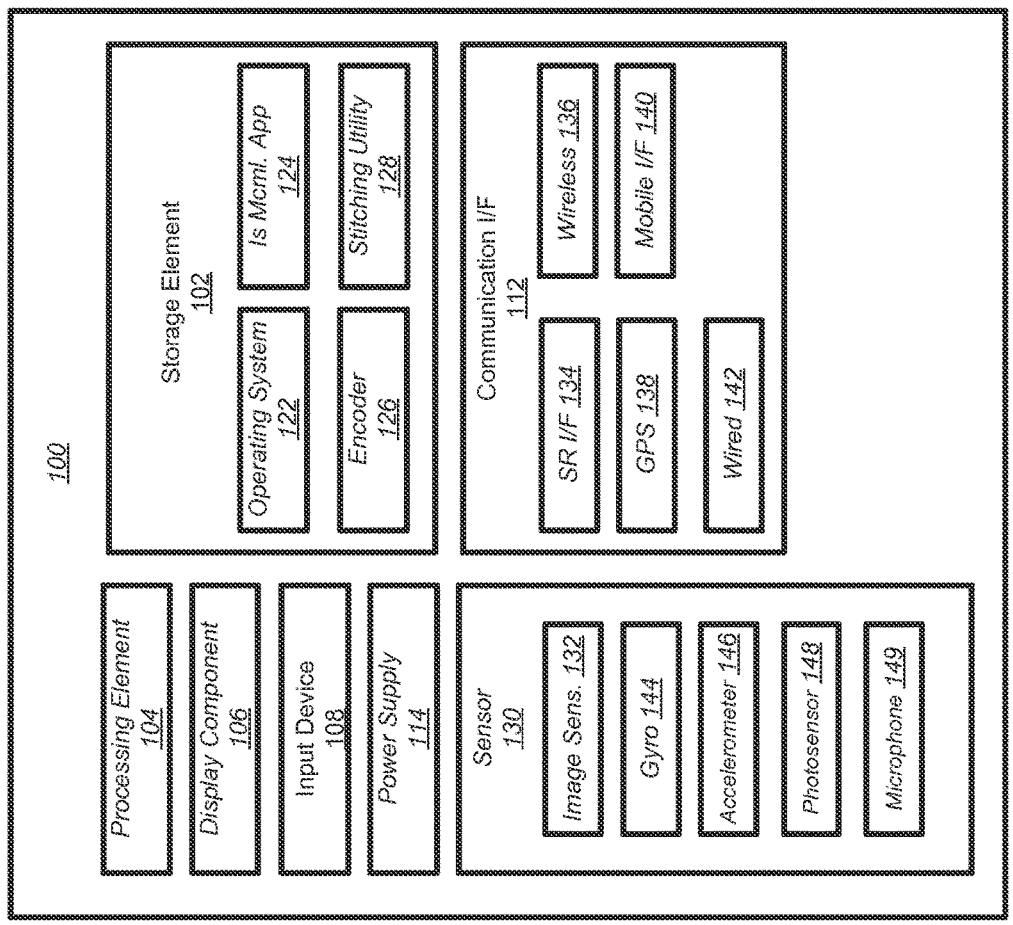
FIG. 5 is a block diagram showing an example architecture of a control circuit of a panoramic camera, such as the panoramic cameras.

FIG. 5 is a block diagram showing an example architecture 100 of a control circuit 17 of a panoramic camera, such as the panoramic cameras 58b, 58c, 58n. It will be appreciated that not all panoramic cameras will include all of the components of the architecture 100 and some panoramic cameras may include additional components not shown in the architecture 100. The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs). The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104. An operating system 122 may provide the user with an interface for operating the panoramic camera and may facilitate communications and commands between applications executing on the architecture 100 and various hardware thereof. An encoder utility 126 may be configured to encode frames according to a suitable encoding format for transmission. Example formats include, the H.264 format, the H.265 format, etc. A stitching utility 128 may be configured to stitch videos received from multiple image sensors 132 into a panoramic frame, for example, as described herein with respect to FIGS. 6-7. An image sensor management app 124 may be configured to selectively turn off one or more image sensors, as described herein. The encoder utility 126 may encode frames received from image sensors 132 (e.g., image sensor frames), frames generated by the stitching utility 128 (e.g., panoramic frames).

When implemented in some panoramic cameras, the architecture 100 may also comprise a display component 106. The display component 106 may comprise one or more light emitting diodes (LEDs) or other suitable display lamps. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The architecture 100 may also include a communication interface 112, comprising one or more wired or wireless components operable to communicate with one or more other user devices and/or with the remote image processor system 4. For example, the communication interface 112 may comprise a wireless communication module 136 configured to communicate on a network, such as the network 8, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth™, Bluetooth LE™, etc. A mobile interface 140 may be configured to communicate utilizing a cellular or other mobile protocol. A Global Positioning System (GPS) module 138 may be in communication with one or more earth-orbiting satellites or other suitable position-determining systems to identify a position of the architecture 100. A wired communication module 142 may be configured to communicate according to the Universal Serial Bus (USB) protocol or any other suitable protocol.

The architecture 100 may also include one or more sensors 130 such as, for example, one or more image sensors and one or more motion sensors. Some examples of the architecture 100 may include multiple image sensors 132, for example, as shown in FIGS. 1-2 and otherwise herein. Motion sensors may include any sensors that sense motion of the architecture including, for example, gyroscopes 144 and accelerometers 146. Motion sensors, in some examples, may be included in user devices such as panoramic cameras, digital cameras, mobile devices, etc., that capture video to be compressed. The gyroscope 144 may be configured to generate a signal indicating rotational motion and/or changes in orientation of the architecture (e.g., a magnitude and/or direction of the motion or change in orientation). Any suitable gyroscope may be used including, for example, ring laser gyroscopes, fiber-optic gyroscopes, fluid gyroscopes, vibration gyroscopes, etc. The accelerometer 146 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 138 may be utilized as a motion sensor. For example, changes in the position of the architecture 100, as determined by the GPS interface 138, may indicate the motion of the GPS interface 138. Other types of motion sensors that may be included in the architecture 100 include digital compass sensors, other location sensors (e.g., utilizing beacon signals or time stamps to determine a current or past location of the architecture), time-of-flight or other depth sensors, etc. In some examples, an image sensor may also be a motion sensor. For example, frames captured by an image sensor may be analyzed to determine a direction and magnitude of the camera's motion. In some examples, the architecture may also include one or more photosensors 148 and/or one or more microphones 149. Any suitable photosensor may be used including, for example, a photodiode. Any suitable type of microphone may also be used. In some examples, photosensors 148 and/or microphones 149 may be utilized to detect content of interest, as described herein.

Figure 6:
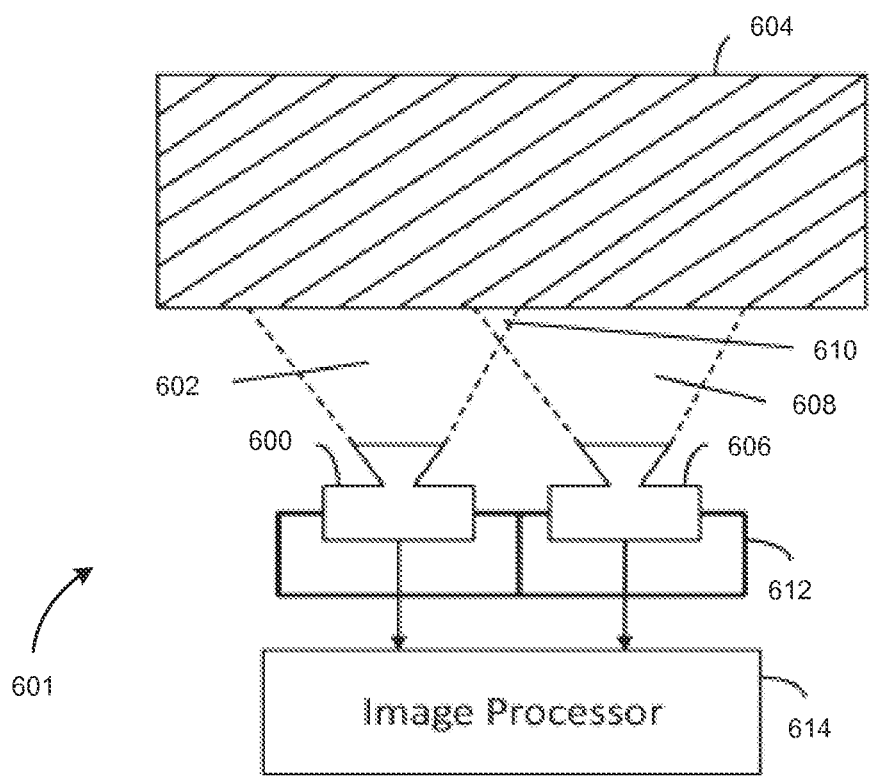
FIG. 6 is a diagram demonstrating one example of a calibration set up that may be used to stitch image sensor frames from a panoramic camera.

As described herein, a control circuit 17 of a panoramic camera (e.g., a stitching utility 128 executed by the control circuit 17) and/or the remote image processor system 4, may be programmed to stitch image sensor frames from two or more image sensors with overlapping fields-of-view to generate a panoramic frame. For example, FIG. 6 is a diagram demonstrating one example of a calibration set up that may be used to stitch image sensor frames from a panoramic camera. A panoramic camera 601 comprises example image sensors 600, 606, a mounting assembly 612 and a control circuit 614. For example, the control circuit 614 may include the processing element 104 executing the stitching utility 128, described herein. Image sensor 600 has a field-of-view 602, while image sensor 606 has a field-of-view 608.

The fields-of-view 602, 608 have an overlap 610. The image sensors 600, 606 may have fixed positions on the mounting assembly 612. The image sensors 600, 606 may have fixed positions other than those shown in FIG. 6. For example, the image sensors 600, 606 may have the fixed positions, similar to the fixed positions of the other various image sensors described herein, or any other suitable position. Although two image sensors 600, 606 are shown in FIG. 6, any suitable number of image sensors may be used including, for example, four image sensors as illustrated in FIG. 5. The image sensors 600, 606 may capture image data and provide the image data to the control circuit 614. The control circuit 614 may be or comprise any suitable type of computing device comprising a central processor, a graphics processing unit and/or another type of processor.

The control circuit 614 may be programmed to utilize frames captured by the image sensors 600, 606 to determine distortion parameters and/or alignment parameters, such as the overlap 610. For example, the image sensors 600, 606 may capture calibration frames showing a standardized calibration fixture 604 from the first and second image sensors 600, 606. The calibration fixture 604 may be any object having thereon a test pattern that allows the control circuit 614 to determine the level of overlap 610 at the pixel level. For example, the calibration fixture 604 may comprise a block, a plate, a cylinder, etc. made from plastic, wood, metal or any other suitable material. The test pattern may be affixed to the calibration fixture 604 in any suitable manner.

For example, the test pattern may be painted, printed, etc. In some examples, the test pattern may be printed on a decal that is bonded to the calibration fixture. In addition, the calibration fixture 604 may enable the control circuit 614 to accommodate any vertical, horizontal, or rotational misalignment of the image sensors 600, 606 as well as any focus errors or areas of soft focus for each image sensor 600, 606 so that the image correction processing can be applied.

In various examples, the test pattern of the calibration fixture 604 includes straight lines. For example, the test pattern may comprise a set of diagonal lines, as illustrated in FIG. 6, or may be in the form of a grid. The control circuit 614 may review frames showing the test pattern captured by various image sensors 600, 606. In various examples, the field-of-view 602, 608 of one or both of the image sensors 600, 606 may have areas of distortion, for example, due to a lens in the optical system (e.g., a lens associated with the image sensor 600, 606 and/or the curved outer surface of an enclosure described herein), or due to some other irregularity in the system. To produce an output image and/or video stream from both image sensors 600, 606, it may be desirable to minimize or eliminate non-uniform distortion, for example, along the edges where frames are joined. For example, frames of the calibration fixture 604 captured by the image sensors 600, 606 may be analyzed by the control circuit 614 to generate an indication of distortions for points in an image plane corresponding to each of the image sensors 600, 606. The control circuit may derive distortion parameters for the various image sensors 600, 606, for example, by observing the curvature of the straight lines of the test pattern as depicted in the frames. For example, distortion parameters may correct for curvature in the straight lines of the test pattern as depicted in frames from the image sensors 600, 606. The control circuit 614 may apply corrections to the distortions in order to generate stitched images and/or video with minimal distortions between image sensor feeds.

The test pattern of the calibration fixture 604 may, in some examples, comprise a color chart and/or uniform gray chart. For example, these charts may allow the control circuit 614 to analyze potential differences in color accuracy, relative illumination, and relative uniformity between image sensors 600, 606. Differences may be stored as correction factors and may be utilized by the control circuit 614 in the stitching process to reduce noticeable differences between image streams. The calibration process may allow for a stitched frame to be stitched from multiple frames received from the image sensors with the viewer being unable to perceive any meaningful change in image quality through the entire stitched frame. The stitched frame may be a stand-alone image or may be part of a panoramic video.

Figure 7:
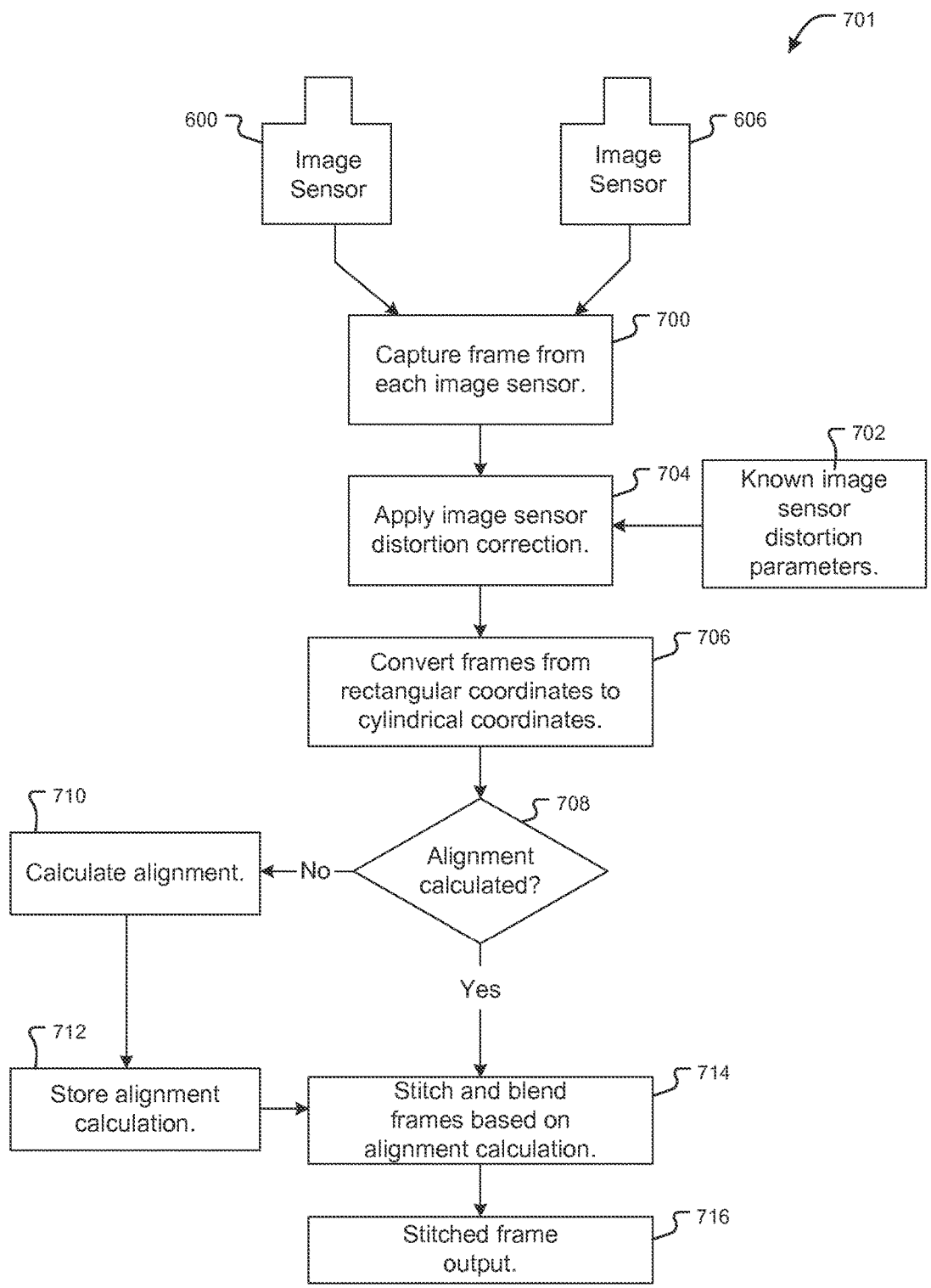
FIG. 7 is a workflow showing one example of a process for stitching frames from image sensors of a panoramic camera.

FIG. 7 is a workflow 701 showing one example of a process for stitching frames from image sensors of a panoramic camera. The workflow 701 is described in the context of the panoramic camera 601 of FIG. 6, although it may be used with any of the panoramic cameras described herein. At 700, the control circuit 614 may capture image sensor frames from the image sensor 600 and the image sensor 606 (e.g., simultaneously). The image sensor frames may be still images and/or part of a video. Stored camera or image sensor distortion parameters 702 may be applied by the control circuit at 704. For example, the image sensor distortion parameters may be based on image sensor frames showing the calibration fixture 604, as described herein. Optionally, at 706, the control circuit 614 may convert the image sensor frames to cylindrical coordinates. For example, frames captured by the image sensors 600, 606 may be initially configured according to the lens or lenses used with the image sensors 600, 606. For example, if a fisheye lens is used, incoming frames may be arranged according to a fisheye coordinate system where each point in the frame had a viewing angle proportional to its distance from the center of the frame. Converting the frames to cylindrical coordinates may facilitate the stitching process by allowing the control circuit to align the extremities of the frames.

At 708, the control circuit 614 may determine whether an alignment has been calculated. If not, an alignment between the image sensors 600, 606 may be found at 710 and stored at 712. Generating the alignment may comprise identifying the overlap regions of the respective frames and determining a translation kernel to correct for parallax or ghosting artifacts. In some examples, overlap regions may be determined considering the position of the optical centers of the image sensors 600, 606 and their respective fields-of-view 602, 608. Translation kernels may be found in any suitable manner. For example, translation kernels may be found considering a reference frame from a reference image sensor, as described herein. The control circuit 614 may proceed to 714. If an alignment between the image sensors 600, 606 has already been found at 708, the control circuit 614 may also proceed to 714 where it may stitch the frames, blending the images based on the stored alignment calculation. For example, stitching may include translating pixels from the frames as indicated by the translation kernel. Stitching at 714 may be performed in any suitable manner. In some examples, the control circuit 614 may apply an alpha blending method. According to an alpha blending method, the control circuit 614 may average redundant pixels from adjacent frames (e.g., pixels from the overlap regions). Different stitching algorithms may provide best results with different levels of overlap between adjacent frames, as described herein. The result of the stitching at 714 may be a stitched frame, output at 716. The stitched frame may be a stand-alone image or part of a video. Although the workflow 701 is described with respect to two image sensors 600, 606, it may be used to stitch any suitable number of frames from any suitable number of image sensors.

Camera distortion and alignment parameters used in the workflow 701 may be found utilizing a calibration process, for example, as described above with respect to FIG. 6. Example image sensor distortion parameters include a lens distortion parameter and a image sensor field-of-view (FOV) parameter, which may be found for each image sensor of a panoramic camera. Example alignment parameters include linear and/or angular offsets between each image sensor that may be used to determine the overlap between the images generated by the image sensors (e.g., 610 in FIG. 6), and translation kernels, as described herein. Although the workflow 701 is described as being executed by a control circuit 614, in some examples, stitching may be performed (or re-performed) at the remote processor system 4, for example.

Figure 8:
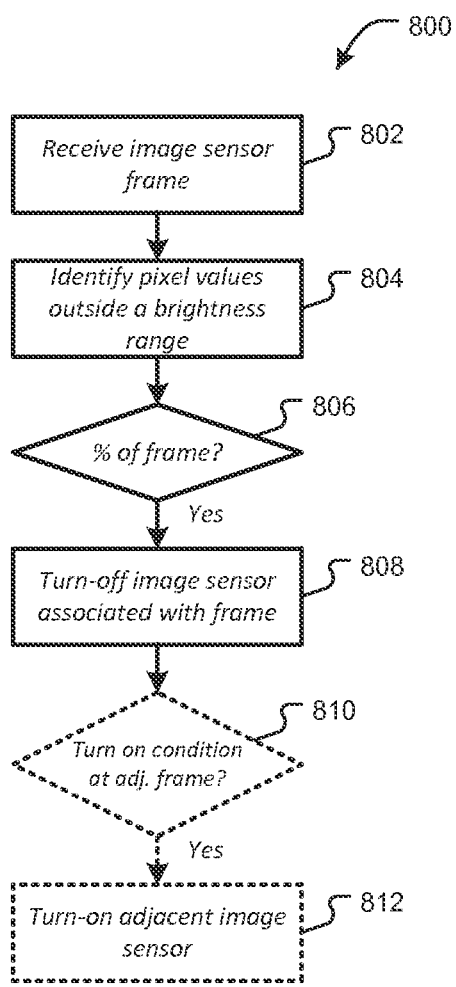
FIG. 8 is a flowchart showing one example of a process flow to select an image sensor to be turned off.

FIG. 8 is a flowchart showing one example of a process flow 800 to identify an image sensor to be turned off. At 802, the control circuit 17 may receive one or more image sensor frames from active image sensors 6*a*, 6*b*, 6*c*, 6*d* (e.g., image sensors that are capturing image sensor frames). At 804, the control circuit 17 may identify, in the received image sensor frames, pixel values that are outside of a threshold brightness range. In some examples, pixel values may be outside of the threshold brightness range if the pixel values are too bright (e.g., above a high brightness threshold) or too dim (e.g., below a low brightness threshold). When pixels are below a low brightness threshold, it may indicate that a region of the three-dimensional scene depicted in the frame is dark. A region of the three-dimensional scene may be dark for a number of reasons including, for example, if the panoramic camera 2 is in a dark room, if a user holds the panoramic camera 2 with one or more of the image sensors 6a, 6b, 6c, 6d obscured or covered, etc. Dark regions of the scene may be assumed not to include content of interest. When pixels are above the high brightness threshold, it may indicate that a region of the three-dimensional scene depicted in the frame is overexposed. For example, a region of a frame may be overexposed if the image sensor is directed towards the sun or another right source. Bright regions of the scene may be assumed not to include content of interest.

Although the example described herein utilizes both a high brightness threshold and a low brightness threshold, in some examples, one or the other may be omitted. For example, the control circuit 17 may identify pixel values below the low brightness threshold only without also identifying pixels about the high brightness threshold. In this way, the control circuit 17 may identify dark regions of the image frame only. Also, for example, the control circuit 17 may identify pixel values above the high brightness threshold without also identifying pixels below the low brightness threshold. In this way, the control circuit 17 may identify bright regions of the image frame only. In some examples, the low and/or high brightness thresholds may be selected by the control circuit 17 dynamically. For example, the low and/or high brightness threshold may be selected considering pixel values captured by all of the image sensors 6a, 6b, 6c, 6d. For example, if the three-dimensional scene is a nighttime scene, then the brightness of all of the pixel values may be lower than if the scene was a daytime scene. The low and/or high brightness thresholds, then, may be accordingly lower. In some examples, the low and/or high brightness thresholds may be placed at particular points on a distribution of brightness across all pixel values captured by the image sensors 6a, 6b, 6c, 6d. For example, pixel values may be lower than the low brightness threshold if the pixel values fall within the lowest 10% of brightness for pixel values captured by the image sensors 6a, 6b, 6c, 6d at a particular time.

The brightness of a pixel value may be determined in any suitable manner. For example, when a pixel value is arranged according to a Red Green Blue (RGB) format, the brightness of the pixel value may be determined by applying a multiplier to each of the R, G and B values and then summing the result, for example, as shown by Equation [1] below:

$$Br=aR+bG+cB \qquad [1]$$

According to Equation [1], Br is the brightness of the pixel. R is the red intensity of the pixel value and a is a red intensity multiplier. G is the green intensity of the pixel value and b is a green intensity multiplier. B is the blue intensity of the pixel value and c is a blue intensity multiplier. In some examples, a, b and c may be selected to account for differences in human sensitivity to different colors. For example, the brightness of a pixel may be the luma of the pixel value.

At 806, the control circuit 17 may determine whether a threshold portion of pixel values from any of the image sensor frames 14a, 14b, 14c, 14d has a brightness below the low brightness threshold and/or above the high brightness threshold. The threshold portion may be, for example, 60%, 75%, 90%, etc. If, at 806, the threshold portion of the pixel values from an image sensor frame 14a, 14b, 14c, 14d is below the brightness threshold, the control circuit 17 may turn off the image sensor 6a, 6b, 6c, 6d that captured the frame or frames below the threshold. If all of the image sensor frames 14a, 14b, 14c, 14d are below the threshold, then the control circuit 17 may turn off all of the image sensors 6a, 6b, 6c, 6d. When an image sensor 6a, 6b, 6c, 6d is turned off, additional image sensor frames 14a, 14b, 14c, 14d from the turned off image sensor may not be used until it is turned on again.

In some examples, the control circuit 17 at 806 may consider the concentration of pixel values above the high brightness threshold and/or below the low brightness threshold. For example, in addition to or instead of finding the percentage of a frame that is above the high brightness threshold or below the low brightness threshold, the control circuit 17 may consider the proximity of low or high brightness pixel values (e.g., pixel values above the high brightness threshold or below the low brightness threshold). For example, if an image sensor frame that otherwise has the threshold of pixel values below the low brightness threshold also includes a high concentration of pixel values not below the low brightness threshold, it may indicate that content of interest is depicted in the image sensor frame. Accordingly, the control circuit 17 may not turn off the image sensor that captured the frame.

Optionally, the control circuit 17 may be further programmed to determine when to turn on an image sensor 6a, 6b, 6c, 6d based on the brightness of image sensor frames from adjacent image sensors. For example, 810 and 812 are actions that may optionally be performed in the process flow 800 or may be performed independent of the process flow 800. At 810, the control circuit 17 may determine whether an image sensor frame received from an image sensor 6a, 6b, 6c, 6d adjacent a turned off image sensor 6a, 6b, 6c, 6d (e.g., an adjacent image sensor frame) meets a turn on condition. Image sensors adjacent a turned off image sensor may be image sensors with fields-of-view that partially overlap the field-of-view of the turned off image sensor. The turn on condition may be any condition indicating that the turned off image sensor may include content of interest. In some examples, the adjacent image sensor frame may meet the turn on condition when a turn on threshold of the pixel values of the adjacent image sensor frame fall within a turn on brightness range. Pixel values within the turn on brightness range may include pixel values above a low turn on threshold brightness and/or below a high turn on threshold brightness. In some examples, the low turn on brightness threshold may be equal to the low brightness threshold for turning off an image sensor (e.g. at 804 above). In some examples, the low turn on brightness threshold may be higher than the low brightness threshold. Similarly, the high turn on brightness threshold may be equal to the high brightness threshold or may be lower than the high brightness threshold.

The turn on threshold of pixel values that should fall in the turn on brightness range may be the same as the threshold number of pixel values for turning off an image sensor, or different. If an image sensor frame from an image sensor adjacent a turned off image sensor meets the turn on conditions, then the control circuit 17 may turn on the adjacent image sensor. For example, if the image sensor 6b is turned off, the control circuit 17 may examine the brightness of one or more of image sensor frames 14a and 14c from image sensors 6a and 6c, which are adjacent to the image sensor 6b. If one or more of the image sensor frames 14a, 14c meet the turn on conditions, then the control circuit 17 may turn on the image sensor 6*b*. In some examples, the turn on brightness threshold may be greater than the brightness threshold considered at 804 and 806 above. In some examples, where frames captured by turned-off image sensors are buffered, the control circuit 17 may be configured to analyze the buffered frames. If a buffered frame meets a turn on condition, the control circuit 17 may turn on the image sensor that captured it.

In some examples, instead of considering full image sensor frames at 810, the control circuit 17 may analyze portions of image sensor frames depicting portions of the three-dimensional scene that are closest to the portions of the three-dimensional scene falling within the field-of-view of the turned off image sensor. For example, referring to FIG. 3, if the image sensor 6*b* is turned off, the control circuit 17 may examine the brightness of a leftward portion of the image sensor frame 14*c* and a rightward portion of the image sensor frame 14*a* to determine whether one or both of those portions meet the turn on conditions. In some examples, at 810, the control circuit 17 may consider the brightness of portions of the adjacent image sensor frames depicting the overlap regions between the field-of-view of the turned off image sensor and the field-of-view or fields-of-view of the adjacent image sensors. For example, referring to FIGS. 2 and 3, if the image sensor 6*c* is turned off, the control circuit 17 may examine the brightness of the overlap region 20*d* of the image sensor frame 14*d* (which depicts the overlap region 19-4 between the field-of-view 12*c* of image sensor 6*c* and the field-of-view 12*d* of the image sensor 6*d*) and/or the overlap region 22*b* of the image sensor frame 14*b* (which depicts the overlap region 19-3 between the field-of-view 12*b* of the image sensor 6*b* and the field-of-view 12*c* of the image sensor 6*c*).

In some examples, instead of receiving individual image sensor frames at 802, the control circuit 17 may receive the stitched panoramic image 16. The control circuit 17 may determine whether to turn off or turn on an image sensor or sensors 6*a*, 6*b*, 6*c*, 6*d* by examining regions of the panoramic frame 16. In one example, the control circuit 17 may examine exclusive regions 26*a*, 26*b*, 26*c*, 26*d* and adjacent hybrid regions 24-1, 24-2, 24-3, 24-4. For example, if the exclusive region 26*a* and its adjacent hybrid regions 24-1 and 24-2 have a threshold number of pixel values below the brightness threshold, then the control circuit 17 may turn off the corresponding image sensor 6*a*. Also, in some examples, the control circuit 17 may consider only the exclusive regions 26*a*, 26*b*, 26*c*, 26*d*. For example, if the exclusive region 26*b* has a threshold number of pixel values below the brightness threshold, then the control circuit 17 may turn off the corresponding image sensor 6*b*. These are just a few examples of the combinations of the exclusive regions 26*a*, 26*b*, 26*c*, 26*d*, 24-1, 24-2, 24-3, 24-4 that may be considered.

The process flow 800 is described herein as being executed by the control circuit 17 at the panoramic camera 2. In some examples, however, the process flow 800 may be executed at the remote image processing system 4. For example, the control circuit 17 may receive image sensor frames 14*a*, 14*b*, 14*c*, 14*d* from the image sensors 6*a*, 6*b*, 6*c*, 6*d* and provide the image sensor frames and/or a panoramic frame stitched from the image sensor frames 14*a*, 14*b*, 14*c*, 14*d* to the remote image processing system 4. In some examples, instead of turning off the image sensor or sensors at 808, the remote image processing system 4 may send a message to the control circuit 17 indicating the image sensor or sensors 6*a*, 6*b*, 6*c*, 6*d* to be turned off.

Figure 9:
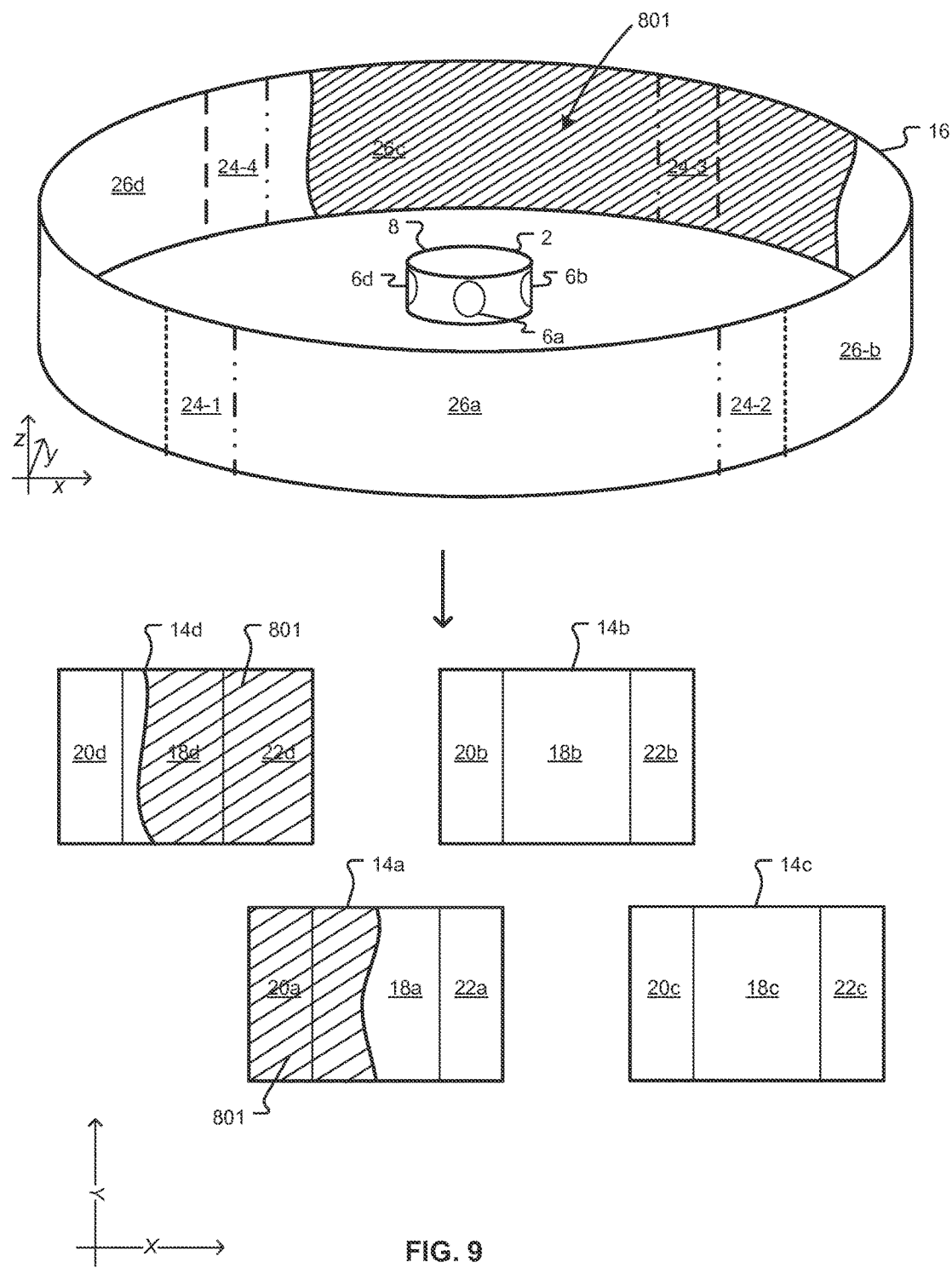
FIG. 9 is a diagram showing examples of the panoramic camera, panoramic frame, and image sensor frames showing an example area comprising pixel values below a brightness threshold.

FIG. 9 is a diagram showing examples of the panoramic camera 2, panoramic frame 16, and image sensor frames 14*a*, 14*b*, 14*c*, 14*d* showing an example region 801 comprising pixel values that may be above a high brightness threshold and/or below a low brightness threshold. The region 801 is shown in on the panoramic frame 16 depicted wrapped around the panoramic camera 2 to illustrate its relationship to the three dimensional space. It is also shown in image sensor frames 14*d* and 14*a*. As illustrated, more than the threshold portion of the image sensor frame 14*d* may be below the brightness threshold. Accordingly, the control circuit 17 may turn off the image sensor 6*d*. Less than the threshold portion of the image sensor frame 14*a* may be below the brightness threshold. Accordingly, the image sensor 6*a* may remain turned on along with the other image sensors 6*b*, 6*c*.

Figure 10:
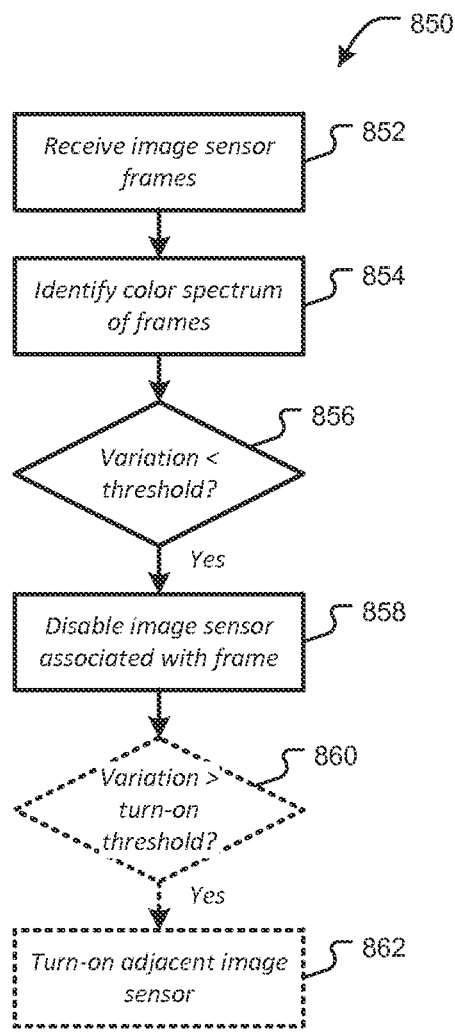
FIG. 10 is a flow chart showing another example of a process flow to select an image sensor to be turned off.

FIG. 10 is a flow chart showing another example of a process flow 850 to select an image sensor to be turned off. The process flow 850 may be executed to identify portions of an image sensor frame or panoramic frame that exhibit less than a threshold level of color variation. Low color variation may be an indicator that an image sensor frame does not include content of interest. For example, a lack of color variation may indicate that an image sensor is pointed towards a monolithic object that is not moving. A lack of color variation may also indicate that an image sensor is obscured (e.g., covered by the user's hand or other body part) or that the image sensor is saturated (e.g., directed towards the sun or another light source).

At 850, the control circuit 17 may receive one or more image sensor frames 14*a*, 14*b*, 14*c*, 14*d*. For example, the control circuit 17 may receive image sensor frames from all image sensors 6*a*, 6*b*, 6*c*, 6*d* in the panoramic camera 2 that are turned on. At 854, the control circuit 17 may identify a color spectrum for each of the received image sensor frames 14*a*, 14*b*, 14*c*, 14*d*. The color spectrum may indicate a distribution of color values across the image sensor frame 14*a*, 14*b*, 14*c*, 14*d*. For examples, when pixel values are expressed in RGB form, the spectrum for an image sensor frame may indicate a distribution of unique combinations of RGB values in the frame. In some examples, the color spectrum may be and/or include a saliency map indicating a degree to which pixel values (and the colors thereof) are distinct from surrounding pixels. Any suitable algorithm may be used to determine the saliency of a pixel value.

At 806, the control circuit 17 may determine whether any of the image sensor frames 14*a*, 14*b*, 14*c*, 14*d* have a color spectrum variation below a turn off threshold. The turn off threshold may be expressed in any suitable form. For example, if a threshold percentage of the pixel values in a frame are within a threshold color variation, then color spectrum variation may be below a color spectrum variation threshold. Image sensors 6*a*, 6*b*, 6*c*, 6*d* producing image sensor frames 14*a*, 14*b*, 14*c*, 14*d* with color spectrum variation below the threshold may be turned off at 808. In some examples, when the color spectrum is or includes a saliency map, the control circuit 17 may turn off an image sensor if the sum of the saliencies of the pixel values in the image sensor frame is below a saliency threshold.

Optionally, the control circuit 17 may be further programmed to determine when to turn on an image sensor 6*a*, 6*b*, 6*c*, 6*d* based on the color spectrum of image sensor frames from adjacent image sensors. For example, 860 and 862 are actions that may optionally be performed in the process flow 850 or may be performed independent of the process flow 850. At 860, the control circuit 17 may determine whether any image sensor frames 14*a*, 14*b*, 14*c*, 14*d* from image sensors 6a, 6b, 6c, 6d adjacent to a turned off image sensor have a color variation exceeding a turn on threshold. The turn on threshold may be higher than the threshold considered at 856. If yes, then the control circuit 17 may, at 862, turn on an image sensor 6a, 6b, 6c, 6d where the image sensor frame 14a, 14b, 14c, 14d from an adjacent image sensor had a spectrum variation greater than the turn on threshold. In some examples, at 862, the control circuit 17 may consider only portions of the image sensors frames 14a, 14b, 14c, 14d depicting portions of the three-dimensional scene that are closest to the portions of the three-dimensional scene falling within the field-of-view of the turned off image sensor, as described herein.

Like the process flow 800, the process flow 850, in some examples, may be executed by examining a panoramic frame 16 in addition to or in lieu of examining the image sensor frames 14a, 14b, 14c, 14d. For example, color spectrum variation may be found across a region (e.g., 26a, 26b, 26c, 26d) of the panoramic frame 16 or exclusive regions 26a, 26b, 26c, 26d and corresponding hybrid regions 24-1, 24-2, 24-3, 24-4. Also like the process flow 800, the process flow 850 may, in some examples, be executed at the remote image processor system 4. For example, the control circuit 17 may provide image sensor frames and/or panoramic frames to the remote image processor system 4 and receive an indication of the image sensor or sensors to be turned off. In some examples, where frames captured by turned-off image sensors are buffered, the control circuit 17 may be configured to analyze the buffered frames. If a buffered frame has a spectrum variation exceeding a turn on threshold, the control circuit 17 may turn on the image sensor that captured it.

Figure 11:
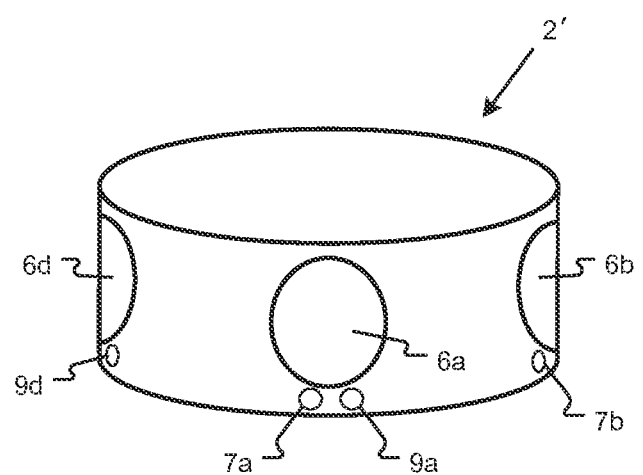
FIG. 11 is a diagram of an example panoramic camera showing example locations for directed photosensors and microphones.

In some examples, the control circuit 17 may be programmed to select image sensors to be turned on or turned off considering directional data captured by one or more sensors other than the image sensors 6a, 6b, 6c, 6d. For example, the panoramic camera may comprise one or more photosensors and/or microphones positioned to receive light and/or sound around the panoramic camera. For example, FIG. 11 is a diagram of an example panoramic camera 2' showing example locations for photosensors and microphones. In some examples, each image sensor 6a, 6b, 6c, 6d may comprise a photosensor directed to receive light incident from all or part of the field-of-view of the image sensor 6a, 6b, 6c, 6d. For example, the view of the panoramic camera 2' shown in FIG. 11 shows a photosensor 7a positioned to sense light incident on the photosensor 7a from all or part of the field-of-view 12a of the image sensor 6a, as well as a photosensor 7b positioned to sense light incident on the photosensor 7b from all or part of the field-of-view 12b of the image sensor 6b. Similar photosensors may be positioned to sense light incident from all or part of the fields-of-view of the image sensors 6c, 6d, although those are not shown in the view of FIG. 11. Although a one-to one relationship between image sensors 6a, 6b, 6c, 6d and photosensors, any suitable number or arrangement of photosensors may be used.

In addition to or instead of the photosensors 7a, 7b, the panoramic camera 2' may include one or more microphones positioned to receive sound originating from the fields-of-view 12a, 12b, 12c, 12d of the respective image sensors 6a, 6b, 6c, 6d. For example, FIG. 11 shows a microphone 9a positioned to sense sound incident on the microphone 9a from all or part of the field-of-view 12a of the image sensor 6a. Another microphone 9d is shown positioned to receive sound from all or part of the field-of-view 12d of the image sensor 6d. Although only two microphones 9a, 9d are shown in the example view of FIG. 11, in some examples, each image sensor 6a, 6b, 6c, 6d may be associated with a microphone in the manner shown. Also, although a one-to one relationship between image sensors 6a, 6b, 6c, 6d and microphones is described, more or fewer microphones may be used. For example, a single directionally-sensitive microphone or array of microphones including more or fewer microphones may be used.

Figure 12:
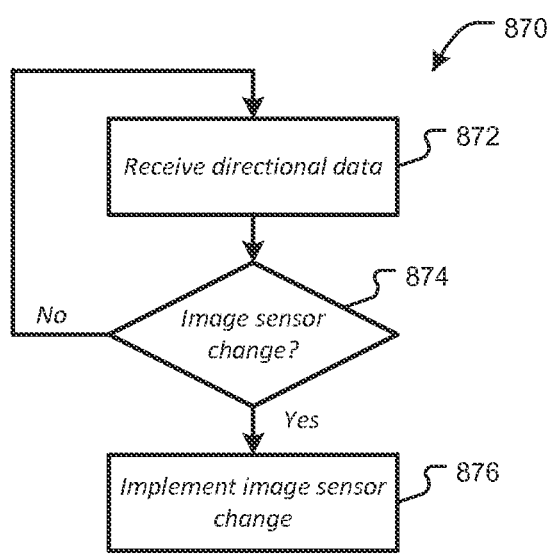
FIG. 12 is a flow chart showing one example of a process flow to identify an image sensor to be turned on or turned off based on directional sensor data.

FIG. 12 is a flow chart showing one example of a process flow 870 to identify an image sensor to be turned on or turned off based on directional sensor data. At 872, the control circuit 17 may receive directional data indicating content of interest. The directional data may be of any suitable form. In some examples, directional data may comprise a signal from a microphone or microphones indicating a sound at a position outside of the panoramic camera 2. For example, referring to FIG. 12, the control circuit 17 may receive an audio signal from a microphone 9a associated with the image sensor 6a. This may indicate a noise, and potential content of interest, in the field-of-view of the image sensor 6a. Similarly, the lack of a signal from a microphone associated with another image sensor 6b, 6c, 6d may indicate a potential lack of content of interest in the fields-of-view of the other image sensor. In some examples, directional data may comprise a signal from one or more photosensors associated with the image sensors 6a, 6b, 6c, 6d (e.g., directed in the direction of the image sensors 6a, 6b, 6c, 6d). For example, if the photosensor associated with an image sensor 6a, 6b, 6c, 6d indicates less than a photosensor turn off brightness threshold at that image sensor, it may indicate a lack of content of interest in the field-of-view of the image sensor. Similarly, if the photosensor associated with an image sensor 6a, 6b, 6c, 6d indicates greater than a photosensor turn on brightness threshold at that image sensor, it may indicate that the photosensor should be turned on. It is envisioned that direction data may include photosensor data, microphone data, and/or other directional data.

At 874, the control circuit 17 may determine if the directional data indicates a change in the active image sensors. For example, if the directional data indicates a sound in the direction of an image sensor 6a, 6b, 6c, 6d, it may indicate that the image sensor should be turned on. If the directional data indicates a brightness in the direction of an image sensor 6a, 6b, 6c, 6d is less than a threshold brightness, it may indicate that the image sensor should be turned off. Similarly, if the directional data indicates a brightness in the direction of an image sensor 6a, 6b, 6c, 6d currently turned off exceeds a turn on threshold, then it may indicate that that image sensor should be turned on. A change in an image sensor state may occur when the directional data indicates that an image sensor 6a, 6b, 6c, 6d currently turned on should be turned off or that an image sensor currently turned on should be turned off. If no change in image sensor state is called for at 874, then the control circuit 17 may receive new directional data at 872. If a change in image sensor state is called for at 874, the control circuit 17 may make the called-for change.

While the process flows 800, 850, 870 may be performed by the control circuit 17 and/or the remote image processor system 4, in some examples, the control circuit 17 and remote image processor system 4 may work in conjunction to select image sensors to turn off or turn on. For example, the control circuit 17 may be utilized for processing that uses limited resources (e.g., processing steps, battery power, etc.). The remote image processing system 4 may be used for processing that cannot be performed, or cannot be performed as efficiently at the control circuit 17. For example, the remote image processor system 4 may be utilized to perform object detection and/or object recognition. The remote image processor system 4 may provide an indication of an identified object to the control circuit 17. The indication may include, for example, a set of pixel locations from the spatial arrangement of the panoramic frame 16 and/or an image sensor frame 14a, 14b, 14c, 14d. Upon receiving the indication of the object, the control circuit 17 may execute a tracking process to track the object. For example, the control circuit 17 may turn on image sensors 14a, 14b, 14c, 14d when the object is in or about to be in the field-of-view of the image sensor. In some examples, however, object recognition and tracking may be performed at the control circuit 17.

Figure 13:
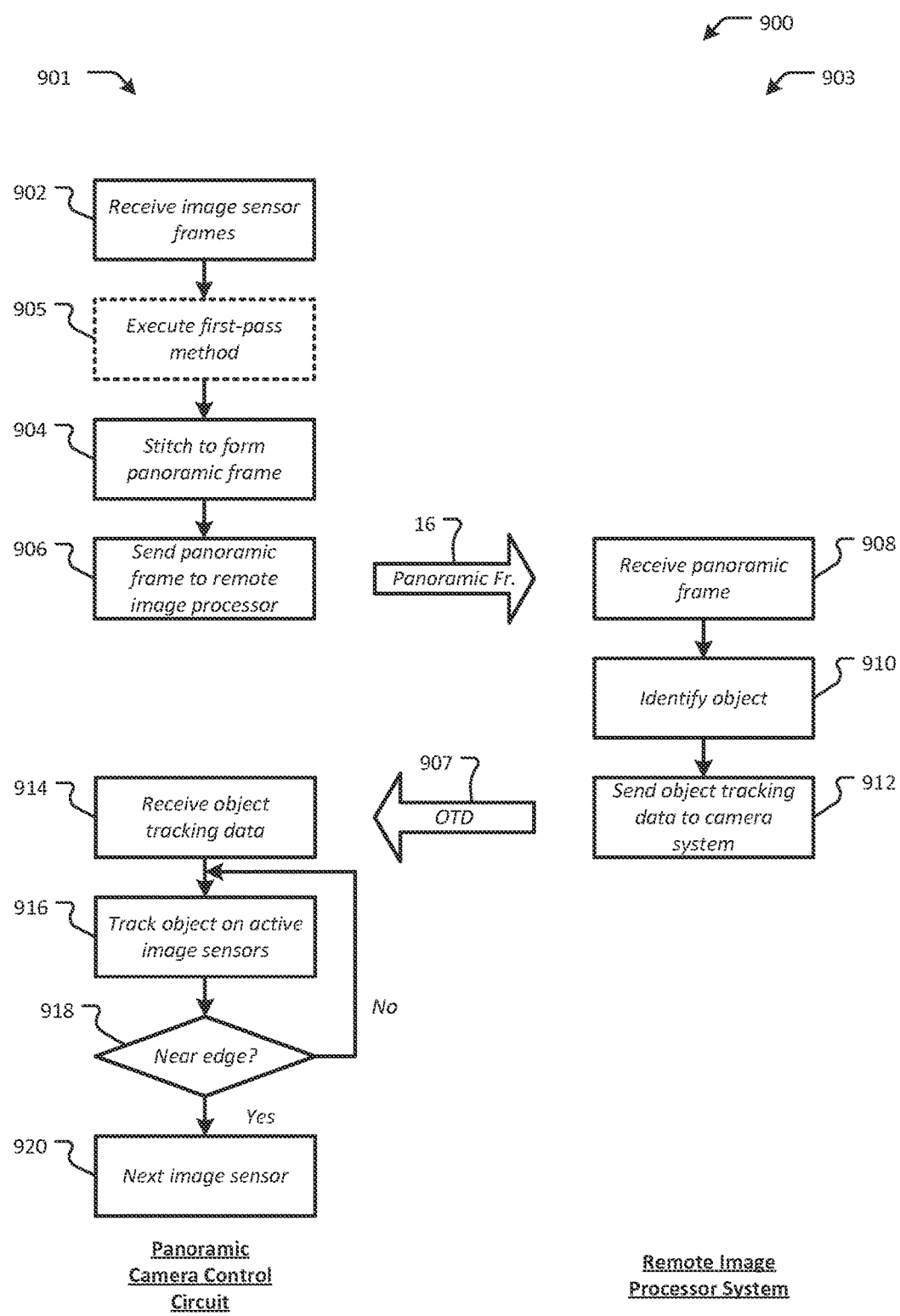
FIG. 13 is a flow chart showing one example of a process flow that may be executed by the panoramic control circuit and the remote image processor system.

FIG. 13 is a flow chart showing one example of a process flow 900 that may be executed by the panoramic control circuit 17 and the remote image processor system 4. A column 901 includes actions that may be performed by the control circuit 17. A column 903 includes actions that may be performed by the remote image processor system 4. At 902, the control circuit 17 may receive image sensor frames 14a, 14b, 14c, 14d from the image sensors 6a, 6b, 6c, 6d. At 904, the control circuit 17 may stitch the image sensor frames 14a, 14b, 14c, 14d to form the panoramic frame 16, for example, as described herein. At 906, the control circuit 17 may send the panoramic frame 16 to the remote image processor system 4.

The remote image processor system 4 may receive the panoramic frame at 908. At 910, the remote image processor system 4 may identify one or more objects in the panoramic frame 908. Identifying an object may include identifying a set of pixel values (e.g., an object set of pixel values) in the panoramic frame 16 that depict the object. The set of pixel values may be near one another according to the spatial arrangement of the panoramic frame 16. In some examples, the set of pixel values may be adjacent one another according to the spatial arrangement of the panoramic frame 16. Any suitable technique or algorithm may be used to identify an object including, for example, an object detection algorithm configured to identify objects of a particular type (e.g., faces, cars, etc.), an object recognition algorithm configured to identify a particular object (e.g., a specific person's face, a specific type of car, etc.) Any suitable object detection or object recognition algorithm may be used. For example, the remote image processor may utilize the Viola-Jones object detection framework (or any other suitable framework) trained using any suitable training images.

At 912, the remote image processing system 4 may send object tracking data 907 to the control circuit 917. Object tracking data may indicate the position in the panoramic frame 16 of depictions of the one or more objects identified at 910. For example, object tracking data for an object may include an identification of the set of pixel values in the panoramic frame 16, including pixel value positions for the set of pixels according to the spatial arrangement of the panoramic frame 16. The control circuit 17 may receive the object tracking data at 914. At 916, the control circuit 17 may track the one or more objects described by the object tracking data 907 in subsequent image sensor frames 14a, 14b, 14c, 14d and/or panoramic frames 16 captured by the panoramic camera 2. The control circuit 17 may track the objects in any suitable manner, described in more detail with respect to FIG. 14.

At 918, the control circuit 17 may determine whether the object's depiction is near an edge between portions of the relevant frame captured by different image sensors. For example, if the object depiction is being tracked relative to the pre-stitched image sensor frames 14a, 14b, 14c, 14d, the control circuit 17 may determine that the object depiction is near an edge when the leading edge pixel position of the object depiction is within a threshold number of pixel positions from an edge of the image sensor frame. If the object is being tracked relative to the panoramic frame 16, the control circuit 17 may determine that the object is near an edge when the leading edge pixel position of the object is within a threshold number of pixel positions from a transition from a region of the panoramic frame captured by one image sensor to a region captured by another image sensor. For example, referring to FIG. 3, an edge in the panoramic frame 16 may be a transition between from an exclusive region 26a, 26b, 26c, 26d to a hybrid region 24-1, 24-2, 24-3, 24-4. For example, exclusive region 26a may be a part of the panoramic frame 16 derived exclusively from the image sensor frame 14a, while adjacent hybrid region 24-2 may be derived from the image sensor frame 14a and the image sensor frame 14b. Accordingly, when the object depiction is within a threshold of the transition from region 26a to region 24-2, the control circuit 17 may turn on the image sensor 6b. In some examples, an edge in the panoramic frame 16 may be a transition from a hybrid region 24-1, 24-2, 24-3, 24-4 to an exclusive region 26a, 26b, 26c, 26d. For example, on a transition from hybrid region 24-2 to exclusive region 26b, the object depiction may leave the area of the panoramic frame 16 derived from the image sensor 6a. Accordingly, the control circuit 17 may turn on the image sensor 6b when the depiction of the object is within the threshold of the exclusive region 26b.

In some examples, the control circuit 17 may set the threshold based on the velocity of the object. For example, the control circuit 17 may know a frame rate at which image sensor frames are being captured and may also know the time necessary to turn on an image sensor that is turned off. Accordingly, when the object is moving towards the edge at a particular number of pixel positions per frame, the control circuit 17 may calculate the number of pixel positions from the edge at which the control circuit 17 must turn on the adjacent image sensor in order to allow it to capture the object when it travels out of the current image sensor frame. In another example where the object is tracked in panoramic frames 16, the control circuit 17 may determine that the object is near an edge when it passes from an exclusive region 26a, 26b, 26c, 26d to a hybrid region 24-1, 24-2, 24-3, 24-4.

If the object is not near an edge, the control circuit 17 may continue to track the object at 816. If the object is near an edge, the control circuit 17 may turn on the next image sensor positioned to detect the object after it crosses the edge. If the next image sensor is already turned on, the control circuit 17 may take no action. In some examples, the control circuit 17 may also be programmed to turn off an image sensor after the object has passed into the field-of-view of the next image sensor.

In examples where the remote image processor system 4 identifies more than one object in the panoramic frame 16, the control circuit 17 may be programmed to simultaneously track all of the identified objects. For example, an image sensor may be turned off only if it fails to depict any of the identified objects. Also, although the process flow 900 describes the control circuit 17 providing the panoramic frame 16 to the remote processor system 4, in some examples, the control circuit 17 may be configured to provide some or all of the image sensor frames 14a, 14b, 14c, 14d to the remote image processor system 4. In return, the remote image processor system 4 may provide object tracking data 907 identifying objects relative to spatial arrangements of the image sensor frames 14a, 14b, 14c, 14d.

Optionally, before sending a panoramic frame 16 or image sensor frames 14a, 14b, 14c, 14d to the remote image processor system 4, the panoramic camera 2 may execute, at 905, a first pass process flow for identifying image sensors to be turned on or turned off. First pass process flows may include techniques that do not have high hardware or power requirements. Example first pass process flows may include one or more of the process flows 800, 850, 870 described herein. If the response of a first pass process flow results in an image sensor being turned off, then the control circuit 17 may not send image sensor frames from the turned off image sensor or image sensors to the remote image processing system 4. For example, the control circuit 17 may send image sensor frames from other image sensors that are turned on. Also, in some examples, the control circuit 17 may send a panoramic frame stitched from image sensor frames received from fewer than all of the image sensors 6a, 6b, 6c, 6d.

Optionally, the control circuit 17 may be programmed to perform object recognition. For example, instead of sending the panoramic frame to the remote image processor system at 906, the control circuit 17 may identify an object or objects and generate tracking data, as described.

Figure 14:
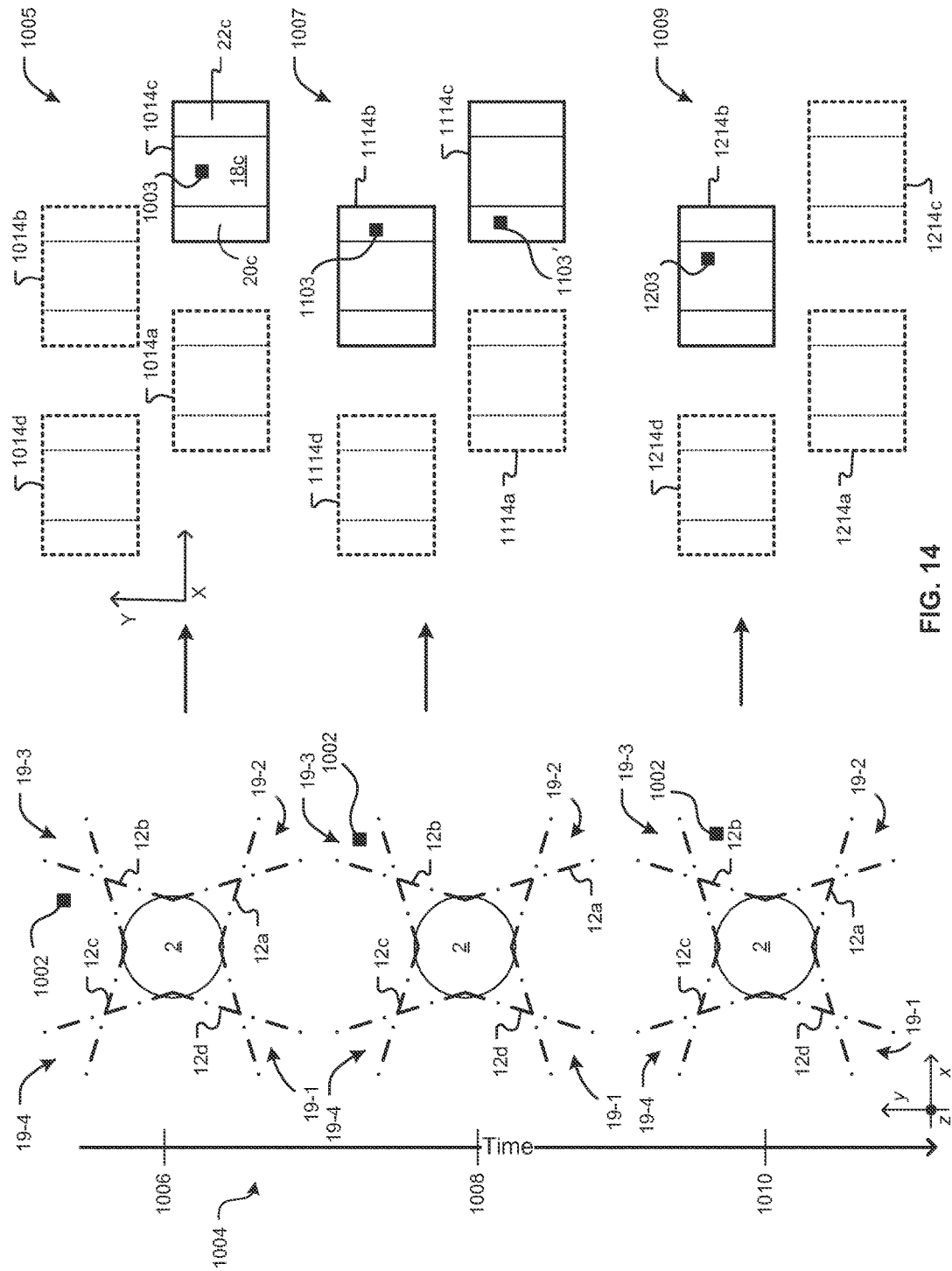
FIG. 14 is a diagram showing one example of a sequence of object positions and image sensor frames captured by the panoramic camera to demonstrate object tracking at the panoramic camera.

FIG. 14 is a diagram showing one example of a sequence of object positions and image sensor frames captured by the panoramic camera 2 to demonstrate object tracking at the panoramic camera 2. Three sets 1005, 1007, 1009 are illustrated. Each set 1005, 1007, 1009 may include image sensor frames captured at different points in time, as indicated by the timeline 1004. For example, the set 1005 of image sensor frames may have been captured at time 1006. The set 1007 of image sensor frames may have been captured at a time 1008 after 1006. The set 1009 of image sensor frames may have been captured at a time 1010 after time 1008. Each set 1005, 1007, 1009 of image sensor frames is accompanied by a corresponding diagram indicating a state of the panoramic camera 2 relative to an object 1002 in the three-dimensional scene around the panoramic camera 2.

Prior to the sequence shown in FIG. 14, the panoramic camera may have receive object tracking data from the remote image processor system 4. The object tracking data may the location in the image sensor frames of a depiction of an object 1002. At time 1006, as illustrated, the object 1002 is positioned in the field-of-view 12c of the image sensor 6c (not shown in FIG. 14) outside of its overlap regions 19-4, 19-3. Accordingly, image sensor 6c may be turned on while image sensors 6a, 6b, and 6d may be turned off. Image sensor frames 1014d, 1014a and 1014b from these image sensors are shown with dashed lines to indicate that the image sensors that would ordinarily capture these frames may be turned off. Image sensor 6a, however, may be turned on and may capture image sensor frame 1014b. A depiction 1003 of the object 1002 is shown in 1014c. The depiction 1003, for example, may comprise an object set of pixel values. The object set of pixel values may be described by a set of pixel positions in the spatial arrangement of image sensor frame 1014c.

The control circuit 17 of the panoramic camera 2 may be programmed to track motion of the object 1002 relative to the panoramic camera 2. Tracking the motion of the object 1002 relative to the panoramic camera 2 may result in a velocity for depictions of the object 1002 (such as 1003) expressed as a direction in the XY plane and a speed, which may be expressed in pixel positions per unit time or per frame. The relative velocity of depictions of the object may be determined in any suitable manner. In some examples, the control circuit 17 may track the object 1002 by examining image sensor frames or panoramic frames captured by the image sensors. For example, the control circuit 17 may identify a depiction of the object 1002 in successive frames captured, for example, according to a sampling rate. Identifying a depiction of a known object in an image sensor frame may be simpler than performing object detection and/or recognition, allowing the control circuit 17 to identify the depiction, in some examples, without utilizing the remote image processor system 4. The control circuit 17 may determine a translation of the depiction between successive frames and estimate a velocity of the object's depiction in subsequent image sensor frames. For example, the velocity may be expressed as pixel locations per frame. In this way, the panoramic camera may identify an estimated location for depictions of the object 1002 in each frame.

In some examples (e.g., examples in which the panoramic camera 2 is moving), the control circuit 17 may track the object 1002 based on signals received from motion sensors such as, for example, the gyroscope 144 and/or the accelerometer 146. For example, tracking the object 1002 from motion of the panoramic camera 2 may be beneficial when the object 1002 is stationary and the panoramic camera 2 is moving. In some examples, the control circuit 17 may receive and/or derive from motion sensor readings a rotation of the panoramic camera about the z dimension. The control circuit 17 may transform the rotation, expressed, for example, in radians or degrees per unit time, into a velocity at the resulting frames, expressed in pixel locations per second or pixel locations per frame. Depictions of the object 1002 may, then, be expected to translate across the image sensor frames in the X dimension in a direction opposite the motion of the panoramic camera 2 relative to the object 1002. In some examples, the control circuit 17 may also receive and/or derive from the motion sensor readings a relative motion of the panoramic camera 2 along the z dimension. This may include translation along the z dimension as well as rotation about the x and y dimensions that translates to translation in the z dimension. The control circuit 17 may transform the translation along the z dimension to a velocity in pixel positions per second or per frame in the Y dimension of the image sensor frames.

When a depiction of the object 1002 appears within a threshold distance of the edge of an image sensor frame, such as 1014c, the control circuit 17 may turn on the next adjacent image sensor. For example, at 1006, the depiction 1003 of the object 1002 may appear within a threshold distance of the right edge of the image sensor frame 1014 and the control circuit 17 may turn on the adjacent image sensor 6b (not shown in FIG. 11). The threshold distance may be selected in any suitable manner. In some examples, the threshold distance may be derived from a speed of the object depiction in the X dimension, as described herein. For example, if the depiction of the object is moving to the left in the X dimension by 100 pixel locations per frame, then the threshold distance may be greater than 100 pixel locations.

In some examples, the depiction 1003 may be within the threshold distance of the right edge of the image sensor frame 1014c. Accordingly, at 1008 (described below), image sensor image sensors 6b may be turned on to capture image sensor frame 1114b. In the example shown in FIG. 14, image sensor 6c is also on at 1008 to capture image sensor frame 1114c. For example, a depiction of 1103 of the object 1002 may appear at image sensor frame 1114b. A similar depiction 1103' of the object 1002 may appear at image sensor frame 1114c. In some examples, prior to capturing the image sensor frames 1114b and 1114c, the control circuit 17 may predict that the object 1002 will be in the overlap region 19-3. Accordingly, the control circuit 17 may turn on the image sensor 6b while leaving the image sensor 6c turned on also. Image sensor frames 1114d and 1114a are shown in dashed lines to indicate that the corresponding image sensors 6a, 6d may be turned off at 1008.

At time 1010, the object 1002 may have moved from the overlap region 19-3 to appear at the field-of-view 12b of the image sensor 6b only. The control circuit 17 may predict this movement based on the predicted velocity of the object 1002 and turn off image sensor 6c. Accordingly, as shown, image sensor frame 1214b may be captured and may show a depiction 1203 of the object 1002. Image sensor frames 1214d, 1214a and 1214c are shown in dashed lines to indicate that the corresponding image sensors 6d, 6a, 6c may be turned off at 1010.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A system for processing image sensor frames, comprising:
   a panoramic camera comprising:
      a first image sensor having a first field-of-view;
      a second image sensor having a second field-of-view that partially overlaps the first field-of-view; and
      a control circuit comprising a control circuit processor and associated control circuit memory, wherein the control circuit is programmed to:
         receive a first frame from the first image sensor, the first frame comprising a first plurality of pixel values and first spatial data describing a two-dimensional arrangement of the first plurality of pixel values;
         receive a second frame from the second image sensor, the second frame comprising a second plurality of pixel values and second spatial data describing a two-dimensional arrangement of the second plurality of pixel values;
         stitch the first frame and the second frame to form a first panoramic frame, wherein the first panoramic frame comprises a third plurality of pixel values and third spatial data describing a two-dimensional arrangement of the third plurality of pixel values;
         receive object data describing an object depicted in the first panoramic frame, wherein the object data comprises an object set of pixel values from the third plurality of pixel values that are contiguous in the two-dimensional arrangement of the third plurality of pixel values;
         identify a second frame object set of pixel values from the second frame that depict the object;
         turn off the first image sensor; and
         generate a second panoramic frame, wherein the second panoramic frame comprises first image data captured by the second image sensor and omits any image data from the first image sensor.

2. The system of claim 1, wherein the control circuit is further programmed to:
receive a third frame from the second image sensor, the third frame comprising a fourth plurality of pixel values and fourth spatial data describing a two-dimensional arrangement of the fourth plurality of pixel values;
comparing the object set of pixel values to the fourth plurality of pixel values to identify a third frame object set of pixel values in the third frame corresponding to the object described by the object data;
determine that the third frame object set of pixel values are positioned within a threshold of an edge of the third frame; and
turn on the first image sensor.

3. The system of claim 1, wherein the control circuit is further programmed to:
send the first panoramic frame to a display application executing at a computing device in communication with the panoramic camera;
after turning off the first image sensor, receive a third frame from the second image sensor, the third frame comprising a fourth plurality of pixel values and fourth spatial data describing a two-dimensional arrangement of the fourth plurality of pixel values; and
send the third frame to a mobile computing device for display at the mobile computing device.

4. The system of claim 1, wherein the control circuit is further programmed to:
receive a third frame from the second image sensor, the third frame comprising a fourth plurality of pixel values and fourth spatial data describing a two-dimensional arrangement of the fourth plurality of pixel values;
receive from a motion sensor motion data describing a motion of the panoramic camera;
determine a component of the motion of the panoramic camera in the third frame; and
determine a first position of a third frame object set of pixel values in the two-dimensional arrangement of the fourth plurality of pixel values by adding the component of the motion of the panoramic camera in the third frame to a second position of the object set of pixel values in the two-dimensional arrangement of the second plurality of pixel values;
determine that the first position of the third frame object set of pixel values is within a threshold of an edge of the third frame; and
turn on the first image sensor.

5. A camera, comprising:
a first image sensor having a first field-of-view;
a second image sensor having a second field-of-view that partially overlaps the first field-of-view; and
a control circuit comprising a control circuit processor and associated control circuit memory, wherein the control circuit is programmed to:
receive a first frame from the first image sensor, wherein the first frame comprises a first plurality of pixel values and first spatial data describing a two-dimensional arrangement of the first plurality of pixel values;
receive a second frame from the second image sensor, wherein the second frame comprises a second plurality of pixel values and second spatial data describing a two-dimensional arrangement of the second plurality of pixel values;
combine the first frame and the second frame to generate a first output frame of the camera;
receive object data describing an object depicted in the first frame, wherein the object data comprises an object set of pixel values from the first plurality of pixel values that are contiguous in the two-dimensional arrangement of the first plurality of pixel values; and
generate a second output frame of the camera omitting data from the second image sensor after the second frame and including data from the first image sensor captured after the first frame, wherein the data from the second image sensor after the second frame is omitted from the second output frame based at least in part on omission of the object data from the second frame.

6. The camera of claim 5, wherein the control circuit is further programmed to:
send the first frame to a remote image processor system;
send the second frame to the remote image processor system; and
receive the object data from the remote image processor system.

7. The camera of claim 5, wherein the control circuit is further programmed to:
send the first frame and the second frame to a stitching utility for combining at least the first frame and the second frame to generate the first output frame;
receive, from the first image sensor, a third frame comprising a third plurality of pixel values and third spatial data describing a two-dimensional arrangement of the third plurality of pixel values; and
store the third frame as the second output frame.

8. The camera of claim 5, further comprising a third image sensor having a third field-of-view that partially overlaps the first field-of-view, wherein the control circuit is further programmed to:
receive a third frame from the third image sensor, wherein the third frame comprises a third plurality of pixel values and third spatial data describing a two-dimensional arrangement of the third plurality of pixel values, and wherein combine the first frame and the second frame to generate the first output frame of the camera also comprises combine the first frame, the second frame and the third frame to generate the first output frame;
determine that a threshold portion of the second plurality of pixel values are outside of a threshold brightness range, wherein the second output frame also omits data from the third image sensor captured after the third frame;
receive a fourth frame from the first image sensor, wherein the fourth frame comprises a fourth plurality of pixel values and fourth spatial data describing a two-dimensional arrangement of the fourth plurality of pixel values;
determine that a turn-on threshold portion of the fourth plurality of pixel values are within a turn-on brightness range;
receive a fifth frame from the first image sensor;
receive a sixth frame from the third image sensor; and
combine the fifth frame and the sixth frame to generate a third output frame comprising turn-on the third image sensor.

9. The camera of claim 5, wherein the control circuit is further programmed to:
store a predetermined number of frames captured by the second image sensor after the second frame; and
determine that at least one of the predetermined number of frames captured by the second image sensor depicts a second object; and
generate a third output frame of the camera comprising data captured by the second image sensor.

10. The camera of claim 5, further comprising a third image sensor having a third field-of-view that partially overlaps the first field-of-view, wherein the control circuit is further programmed to:
receive a third frame from the third image sensor, wherein the third frame comprises a third plurality of pixel values and third spatial data describing a two-dimensional arrangement of the third plurality of pixel values, and wherein combine the first frame and the second frame to generate the first output frame of the camera also comprises combine the first frame, the second frame and the third frame to generate the first output frame;
determine that a threshold portion of the second plurality of pixel values are outside of a threshold brightness range, wherein the second output frame also omits data from the third image sensor captured after the third frame;
receive a fourth frame from the first image sensor, wherein the fourth frame comprises a fourth plurality of pixel values and fourth spatial data describing a two-dimensional arrangement of the fourth plurality of pixel values;
select an overlap portion of pixel values from the fourth plurality of pixel values corresponding to a portion of the first field-of-view that is partially overlapped by the third field-of-view;
determine that a turn-on threshold portion of the overlap portion of pixel values are above a turn-on brightness threshold;
receive a fifth frame from the first image sensor;
receive a sixth frame from the third image sensor; and
combine the fifth frame and the sixth frame to generate a third output frame.

11. The camera of claim 5, further comprising a third image sensor having a third field-of-view that partially overlaps the first field-of-view, wherein the control circuit is further programmed to:
receive a third frame from the third image sensor, wherein the third frame comprises a third plurality of pixel values and third spatial data describing a two-dimensional arrangement of the third plurality of pixel values;
determine a color spectrum variation for the third frame; and
determine that the color spectrum variation for the third frame is less than a turn-off threshold, wherein the second output frame also omits data from the third image sensor captured after the third frame.

12. The camera of claim 11, wherein the control circuit is further programmed to:
receive a fourth frame from the first image sensor, wherein the fourth frame comprises a fourth plurality of pixel values and fourth spatial data describing a two-dimensional arrangement of the fourth plurality of pixel values;
determine a second color spectrum variation for the fourth frame;
determine that the color spectrum variation for the fourth frame exceeds a turn-on threshold;
receive a fifth frame from the first image sensor;
receive a sixth frame from the third image sensor; and
combine the fifth frame and the sixth frame to generate a third output frame.

13. The camera of claim 5, further comprising a photosensor directed to receive light from at least a portion of the second field-of-view, wherein the control circuit is further programmed to:
receive a brightness signal from the photosensor;
determine that the brightness signal is greater than a photosensor turn-on threshold;
receive a third frame from the first image sensor;
receive a fourth frame from the second image sensor; and
combine the third frame and the fourth frame to generate a third output frame.

14. The camera of claim 5, further comprising a microphone directed to detect sound from at least a portion of the second field-of-view, wherein the control circuit is further programmed to:
receive, from the microphone, an audio signal indicating a sound in the second field-of-view;
turn on the second image sensor;
receive a third frame from the first image sensor;
receive a fourth frame from the second image sensor; and
combine the third frame and the fourth frame to generate a third output frame.

15. The camera of claim 5, wherein the control circuit is further programmed to receive a third frame from the second image sensor after the second output frame is generated.

* * * * *